(12) United States Patent
Zhang et al.

(10) Patent No.: US 12,289,476 B2
(45) Date of Patent: Apr. 29, 2025

(54) SYSTEMS AND METHODS FOR DATA TRANSMISSION

(71) Applicant: ZHEJIANG DAHUA TECHNOLOGY CO., LTD., Zhejiang (CN)

(72) Inventors: Jinyu Zhang, Hangzhou (CN); Fei Wang, Hangzhou (CN); Xiang Li, Hangzhou (CN); Zhiji Deng, Hangzhou (CN); Ming Liu, Hangzhou (CN); Qi Ye, Hangzhou (CN); Yongjun Fang, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 54 days.

(21) Appl. No.: 18/192,665

(22) Filed: Mar. 30, 2023

(65) Prior Publication Data
US 2023/0262266 A1    Aug. 17, 2023

Related U.S. Application Data

(63) Continuation of application No. PCT/CN2021/122903, filed on Oct. 9, 2021.

(30) Foreign Application Priority Data

Oct. 16, 2020  (CN) .......................... 202011109867.2
Nov. 16, 2020  (CN) .......................... 202011280028.7
Nov. 20, 2020  (CN) .......................... 202011312570.6

(51) Int. Cl.
*H04N 19/895*   (2014.01)
*H04N 7/18*     (2006.01)

(52) U.S. Cl.
CPC ............. *H04N 19/895* (2014.11); *H04N 7/18* (2013.01)

(58) Field of Classification Search
CPC ............................. H04N 19/895; H04N 7/18
See application file for complete search history.

(56) References Cited

U.S. PATENT DOCUMENTS

| | | | |
|---|---|---|---|
| 2004/0027890 A1* | 2/2004 | Nakanishi | ............ H04N 9/8042 386/E9.036 |
| 2011/0169952 A1 | 7/2011 | Yamaguchi et al. | |

(Continued)

FOREIGN PATENT DOCUMENTS

| | | |
|---|---|---|
| CN | 111741276 A | 10/2020 |
| CN | 111787292 A | 10/2020 |

(Continued)

OTHER PUBLICATIONS

First Office Action in Chinese Application No. 202011109867.2 mailed on Dec. 23, 2021, 16 pages.

(Continued)

*Primary Examiner* — Shawn S An
(74) *Attorney, Agent, or Firm* — METIS IP LLC

(57) ABSTRACT

A method may include obtaining parameter information of a plurality of acquisition devices that communicate with the system to transmit video data to the system. The parameter information of each of the plurality of acquisition device may include transmission information of a target key frame of the video data of the acquisition device. The method may also include determining, based on the parameter information, whether there are collision key frames in the target key frames of the plurality of acquisition devices. The method may also include adjusting an original generation time of at least one of the collision key frames in response to determining that there are collision key frames, so that after the (Continued)

adjustment, there is no collision key frame in the target key frames of the plurality of acquisition devices.

20 Claims, 21 Drawing Sheets

(56) References Cited

U.S. PATENT DOCUMENTS

| | | |
|---|---|---|
| 2011/0310217 A1 | 12/2011 | Lee et al. |
| 2012/0087583 A1 | 4/2012 | Yang et al. |
| 2013/0204973 A1* | 8/2013 | Yie .................. H04L 65/612 709/217 |
| 2015/0085132 A1 | 3/2015 | Bekiares et al. |
| 2015/0296188 A1* | 10/2015 | Meganathan .... G08B 13/19682 348/143 |
| 2015/0312651 A1* | 10/2015 | Zhuang ............ H04N 19/164 348/143 |
| 2016/0065994 A1* | 3/2016 | Kokaska ............. H04N 19/68 375/240.26 |
| 2016/0366484 A1 | 12/2016 | Cudak et al. |
| 2017/0264866 A1 | 9/2017 | Li et al. |
| 2019/0335214 A1* | 10/2019 | Bayoumi ............ G06F 9/45558 |
| 2019/0394249 A1* | 12/2019 | Suzuki ................ H04N 21/235 |
| 2020/0104969 A1* | 4/2020 | Aratani ..................... G06T 7/73 |
| 2021/0306640 A1* | 9/2021 | Tanner ................ H04N 19/176 |

FOREIGN PATENT DOCUMENTS

| | | |
|---|---|---|
| CN | 112399141 A | 2/2021 |
| WO | 9952282 A1 | 10/1999 |
| WO | 2015127865 A1 | 9/2015 |
| WO | 2020101547 A1 | 5/2020 |
| WO | 2020133465 A1 | 7/2020 |

OTHER PUBLICATIONS

International Search Report in PCT/CN2021/122903 mailed on Jan. 6, 2022, 4 pages.
Written Opinion in PCT/CN2021/122903 mailed on Jan. 6, 2022, 5 pages.
The Extended European Search Report in European Application No. 21879311.5 mailed on Jan. 2, 2024, 9 pages.

* cited by examiner

600

| Obtaining parameter information of a plurality of acquisition devices that communicate with a processing device to transmit video data to the processing device, the parameter information of each of the plurality of acquisition device including transmission information of a target key frame of the video data of the acquisition device | ~610 |

↓

| Determining, based on the parameter information, whether there are collision key frames in the target key frames of the plurality of acquisition devices | ~620 |

↓

| In response to determining that there are collision key frames, adjusting an original generation time of at least one of the collision key frames, so that after the adjustment, there is no collision key frame in the target key frames of the plurality of acquisition devices | ~630 |

Dividing the hash period into a plurality of slots based on the size of GOP and the IFS, each of the plurality of slots including at least one IFS — 710

Mapping the target key frames of the plurality of acquisition devices into the plurality of slots of the hash period based on the timestamps of the target key frames — 720

Determining whether a second count of target key frames in one of the plurality of slots is larger than a second count threshold — 730

In response to determining that the second count of target key frames in one of the plurality of slots is larger than the second count threshold, determining the target key frames in the one of the plurality of slots as the collision key frames — 740

For each of a plurality of slots of the hash period, determining an idle weight of the slot based on whether the slot and one or more adjacent slots of the slot are the idle periods  ⟋ 910

Adjusting the original generation time of at least one collision key frame, so that the at least one adjusted collision key frame is in at least one of the one or more idle periods of which the idle weight is larger than a weight threshold  ⟋ 920

Obtaining transmission periods of target key frames of a plurality of acquisition devices connected to the back-end device, and determining the target key frames of which the transmission periods overlaps with each other as collision key frames  ∕1210

Obtaining an adjusted generation time of at least one of the collision key frame by adjusting an original generation time of the at least one collision key frame  ∕1220

Transmitting an adjustment instruction to the corresponding acquisition device according to the adjusted generation time of the at least one adjusted key frame  ∕1230

```
┌─────────────────────────────────────────────────────────────┐
│ Obtaining transmission periods of target key frames of a    │
│ plurality of acquisition devices connected to the back-end  │      1310
│ device, and determine the target key frames of which the    │
│ transmission periods overlaps with each other as collision  │
│ key frames                                                  │
└─────────────────────────────────────────────────────────────┘
                              │
                              ▼
┌─────────────────────────────────────────────────────────────┐
│                                                             │      1320
│           Obtaining idle periods in the hash period         │
│                                                             │
└─────────────────────────────────────────────────────────────┘
                              │
                              ▼
┌─────────────────────────────────────────────────────────────┐
│ Obtaining an adjusted generation time of at least one of the│
│ collision key frames by adjusting the original generation   │      1330
│ time of the at least one collision key frame so that the at │
│ least one adjusted key frame is in at least one idle period │
└─────────────────────────────────────────────────────────────┘
                              │
                              ▼
┌─────────────────────────────────────────────────────────────┐
│                                                             │      1340
│ Transmitting an adjustment instruction to the corresponding │
│ acquisition device according to the adjusted generation time│
└─────────────────────────────────────────────────────────────┘
```

```
┌─────────────────────────────────────────────────────────┐
│ Obtaining the parameter information of the acquisition  │
│ devices connected to the back-end device, wherein the   │  1410
│ parameter information may include the transmission      │
│ periods of the target key frames and the size of GOP    │
└─────────────────────────────────────────────────────────┘
                            │
                            ▼
┌─────────────────────────────────────────────────────────┐
│ Mapping the transmission periods of the target key      │  1420
│ frames into a hash period equal to size of GOP to       │
│ extract idle periods in the hash period                 │
└─────────────────────────────────────────────────────────┘
```

FIG. 14

SYSTEMS AND METHODS FOR DATA TRANSMISSION

CROSS-REFERENCE TO RELATED APPLICATIONS

This application is a Continuation of International Application No. PCT/CN2021/122903, filed on Oct. 9, 2021, which claims priority to Chinese Patent Application No. 202011109867.2 filed on Oct. 16, 2020, Chinese Patent Application No. 202011280028.7 filed on Nov. 16, 2020, and Chinese Patent Application No. 202011312570.6 filed on Nov. 20, 2020, the contents of each of which are incorporated herein by reference in their entirety.

TECHNICAL FIELD

The present disclosure generally relates to data communication technology, and in particular, to systems and methods for detecting key frame collision in data transmission.

BACKGROUND

The acquisition device such as Internet protocol camera (IPC) has been widely used in the security field. A plurality of the acquisition devices may be connected to a back-end device (e.g., a server or a network) and transmit video data to the back-end device. The greater the count of the acquisition devices is, the greater the probability that a plurality of key frames reach the back-end device at the same time may be, which may occur key frame collision and affect the real-time performance and stability of data transmission. Therefore, it is desirable to provide systems and/or method for detecting key frame collision.

SUMMARY

According to an aspect of the present disclosure, a system may include one or more storage devices and one or more processors configured to communicate with the one or more storage devices. The one or more storage devices may include a set of instructions. When the one or more processors executing the set of instructions, the one or more processors may be directed to perform one or more of the following operations. The one or more processors may obtain parameter information of a plurality of acquisition devices that communicate with the system to transmit video data to the system. The parameter information of each of the plurality of acquisition device may include transmission information of a target key frame of the video data of the acquisition device. The one or more processors may determine, based on the parameter information, whether there are collision key frames in the target key frames of the plurality of acquisition devices. The one or more processors may adjust an original generation time of at least one of the collision key frames in response to determining that there are collision key frames, so that after the adjustment, there is no collision key frame in the target key frames of the plurality of acquisition devices.

According to another aspect of the present disclosure, a method include one or more of the following operations. One or more processors may obtain parameter information of a plurality of acquisition devices that communicate with the system to transmit video data to the system. The parameter information of each of the plurality of acquisition device may include transmission information of a target key frame of the video data of the acquisition device. The one or more processors may determine, based on the parameter information, whether there are collision key frames in the target key frames of the plurality of acquisition devices. The one or more processors may adjust an original generation time of at least one of the collision key frames in response to determining that there are collision key frames, so that after the adjustment, there is no collision key frame in the target key frames of the plurality of acquisition devices.

According to yet another aspect of the present disclosure, a system may include a collision detection module configured to obtain parameter information of a plurality of acquisition devices that communicate with the system to transmit video data to the system. The parameter information of each of the plurality of acquisition device may include transmission information of a target key frame of the video data of the acquisition device. The collision detection module may also be configured to determine, based on the parameter information, whether there are collision key frames in the target key frames of the plurality of acquisition devices. The system may include an adjustment module configured to adjust an original generation time of at least one of the collision key frames in response to determining that there are collision key frames, so that after the adjustment, there is no collision key frame in the target key frames of the plurality of acquisition devices.

According to yet another aspect of the present disclosure, a non-transitory computer readable medium may comprise at least one set of instructions. The at least one set of instructions may be executed by one or more processors of a computing device. The one or more processors may obtain parameter information of a plurality of acquisition devices that communicate with the system to transmit video data to the system. The parameter information of each of the plurality of acquisition device may include transmission information of a target key frame of the video data of the acquisition device. The one or more processors may determine, based on the parameter information, whether there are collision key frames in the target key frames of the plurality of acquisition devices. The one or more processors may adjust an original generation time of at least one of the collision key frames in response to determining that there are collision key frames, so that after the adjustment, there is no collision key frame in the target key frames of the plurality of acquisition devices.

In some embodiments, communication ways between the plurality of acquisition devices and the system may be the same.

In some embodiments, the parameter information may further include a size of a group of picture (GOP). To determine, based on the parameter information, whether there are collision key frames in the target key frames of the plurality of acquisition devices, the one or more processors may determine a hash period based on the size of GOP. The one or more processors may map the target key frames of the plurality of acquisition devices into the hash period based on the transmission information of the target key frames of the plurality of acquisition devices. The one or more processors may determine, based on the mapping of the target key frames in the hash period, whether there are collision key frames in the target key frames of the plurality of acquisition devices.

In some embodiments, to adjust the original generation time of the at least one of the collision key frames, so that after the adjustment, there is no collision key frame in the target key frames of the plurality of acquisition devices, the one or more processors may determine one or more idle periods in the hash period based on the mapping of the target key frames in the hash period. A first count of target key frames in each of the one or more idle periods may be less than a first count threshold. The one or more processors may adjust the original generation time of the at least one collision key frame, so that the at least one adjusted collision key frame is in the one or more idle periods.

In some embodiments, to adjust the original generation time of the at least one collision key frame, so that the at least one adjusted collision key frame is in the one or more idle periods, the one or more processors may keep the original generation time of one of the collision key frames unchanged. The one or more processors may adjust the original generation time of the remaining of the collision key frames, so that the at least one adjusted collision key frame is in the one or more idle periods.

In some embodiments, the parameter information may further include an inter frame space (IFS). The transmission information may include timestamps of the target key frames of the plurality of acquisition devices at which the system will receives the target key frames. To determine, based on the parameter information, whether there are collision key frames in the target key frames of the plurality of acquisition devices, the one or more processors may divide the hash period into a plurality of slots based on the size of GOP and the IFS, each of the plurality of slots including at least one IFS. The one or more processors may map the target key frames of the plurality of acquisition devices into the plurality of slots of the hash period based on the timestamps of the target key frames. The one or more processors may determine whether a second count of target key frames in one of the plurality of slots is larger than a second count threshold. In response to determining that the second count of target key frames in one of the plurality of slots is larger than the second count threshold, the one or more processors may determine the target key frames in the one of the plurality of slots as the collision key frames.

In some embodiments, to divide the hash period into the plurality of slots based on the size of GOP and the IFS, the one or more processors may determine a hash time interval based on the IFS. The one or more processors may divide the hash period by the hash time interval. The one or more processors may determine, as a hash array count, a first integer value that is equal to an integer part of the division. The one or more processors may divide the hash period into the plurality of slots based on the hash time interval and the hash array count.

In some embodiments, the parameter information may further include a count of the plurality of acquisition devices. The hash time interval may be determined based on the IFS, the size of GOP, and the count of the plurality of acquisition devices.

In some embodiments, to map the target key frames of the plurality of acquisition devices into the plurality of slots of the hash period based on the timestamps of the target key frames, for each of the target key frames, the one or more processors may determine, in the plurality of slots of the hash period, an original slot of the target key frame based on the timestamp of the target key frame.

In some embodiments, to determine, in the plurality of slots of the hash period, the original slot of the target key frame based on the timestamp of the target key frame, the one or more processors may determine a first remainder by dividing the timestamp of the target key frame by the hash period. The one or more processors may determine a second integer value that is equal to an integer part of a division between the first remainder and the hash time interval. The one or more processors may designate one of the plurality of slots of the hash period corresponding to the second integer value as the original slot of the target key frame.

In some embodiments, to determine, in the plurality of slots of the hash period, the original slot of the target key frame based on the timestamp of the target key frame, the one or more processors may determine a second remainder by dividing the second integer value by the hash array count. The one or more processors may determine whether the second integer value is equal to the second remainder. In response to determining that the second integer value is equal to the second remainder, the one or more processors may determine the second integer value as being effective. In response to determining that the second integer value is not equal to the second remainder, the one or more processors may determine the second integer value as being non-effective.

In some embodiments, to map the target key frames of the plurality of acquisition devices into the plurality of slots of the hash period based on the timestamps of the target key frames, the one or more processors may determine, in the plurality of slots of the hash period, a modified slot of the target key frame based on the original slot and a first slot of a previous key frame immediately prior to the target key frame.

In some embodiments, to determine, in the plurality of slots of the hash period, the modified slot of the target key frame based on the original slot and the first slot of the previous key frame immediately prior to the target key frame, the one or more processors may designate a serial number for the target key frame. The one or more processors may compare the serial number with a number threshold. The one or more processors may determine, in the plurality of slots of the hash period, the modified slot of the target key frame based on the comparison, the original slot, and the first slot of the previous key frame of the target key frame.

In some embodiments, to determine, in the plurality of slots of the hash period, the modified slot of the target key frame based on the comparison, the original slot, and the first slot of the previous key frame of the target key frame, in response to determining that the serial number is less than the number threshold, the one or more processors may determine an average value of the original slot and the first slot as the modified slot.

In some embodiments, to determine, in the plurality of slots of the hash period, the modified slot of the target key frame based on the comparison, the original slot, and the first slot of the previous key frame of the target key frame, in response to determining that the serial number is larger than or equal to the number threshold, the one or more processors may determine an average value by dividing a sum by the number threshold. The sum may be equal to the original slot plus a product of a factor value and the first slot. The factor value may be equal to the number threshold minus 1. The one or more processors may determine the average value as the modified slot.

In some embodiments, to map the target key frames of the plurality of acquisition devices into the plurality of slots of the hash period based on the timestamps of the target key frames, the one or more processors may obtain a second slot of a subsequent key frame immediately after the target key frame. The one or more processors may determine a difference between the second slot and the modified slot. The one or more processors may determine whether the difference is larger than or equal to a difference threshold. In response to determining that the difference is larger than or equal to the difference threshold, the one or more processors may number the key frames after the target key frame starting from the subsequent key frame.

In some embodiments, to adjust the original generation time of at least one of the collision key frames, so that after the adjustment, there is no collision key frame in the target key frames of the plurality of acquisition devices, the one or more processors may adjust the original generation time of the at least one collision key frame, so that after the adjustment, a third count of target key frames in the one of the plurality of slots is less than a third count threshold.

In some embodiments, each of the one or more idle periods may correspond to one of the plurality of slots that is different from the slot corresponding to the collision key frames.

In some embodiments, to adjust the original generation time of the remaining of the collision key frames, so that the at least one adjusted collision key frame is in the one or more idle periods, for each of the plurality of slots, the one or more processors may determine an idle weight of the slot based on whether the slot and one or more adjacent slots of the slot are the idle periods. The one or more processors may adjust the original generation time of the remaining of the collision key frames, so that the at least one adjusted collision key frame is in at least one of the one or more idle periods of which the idle weight is larger than a weight threshold.

In some embodiments, in the plurality of slots, a first end slot at a first end of the hash period may be deemed to be adjacent to a second end slot at a second end of the hash period. To determine the idle weight of the slot based on whether the slot and the one or more adjacent slots of the slot are the idle periods, the one or more processors may determine whether the slot is the idle period. In response to determining that the slot is not the idle period, the one or more processors may determine the idle weight of the slot as 0. In response to determining that the slot is the idle period, the one or more processors may determine a fourth count of consecutive slots that are idle periods and on a first side of the slot. The one or more processors may determine a fifth count of consecutive slots that are idle periods and on a second side of the slot. The one or more processors may determine 1 plus a smaller value of the fourth count and the fifth count as the idle weight of the slot.

In some embodiments, to determine the idle weight of the slot based on whether the slot and the one or more adjacent slots of the slot are the idle periods, the one or more processors may determine whether the slot is at the first end or the second end of the hash period. In response to determining that the slot is not at the first end or the second end of the hash period, the one or more processors may determine the idle weight of another slot of the plurality of slots.

In some embodiments, to adjust the original generation time of the remaining of the collision key frames, so that the at least one adjusted collision key frame is in the at least one of the one or more idle periods of which the idle weight is larger than the weight threshold, the one or more processors may adjust the original generation time of one of the remaining of the collision key frames, so that the adjusted collision key frame is in one of the plurality of slots with a maximum idle weight.

In some embodiments, the transmission information of the target key frames may include transmission periods of the target key frames in which the target key frames will be transmitted from the plurality of acquisition devices to the system. To determine, based on the parameter information, whether there are collision key frames in the target key frames of the plurality of acquisition devices, the one or more processors may map the target key frames of the plurality of acquisition devices into the hash period by mapping the transmission periods of the target key frames into the hash period. The one or more processors may determine, based on the mapping of the transmission periods, the target key frames that overlap with each other as the collision key frames.

In some embodiments, to adjust the original generation time of the remaining of the collision key frames, so that the at least one adjusted collision key frame is in the one or more idle periods, the one or more processors may adjust the original generation time of one of the remaining of the collision key frames, so that the transmission period of the adjusted collision key frame is in the middle of one of the one or more idle periods.

In some embodiments, to adjust the original generation time of the remaining of the collision key frames, so that the at least one adjusted collision key frame is in the one or more idle periods, the one or more processors may obtain a key frame to be adjusted in the remaining of the collision key frames. The one or more processors may determine whether there is at least one idle period.

In response to determining that there is at least one idle period, the one or more processors may rank the at least one idle period based on time duration of the at least one idle period. The one or more processors may determine a longest idle period among the at least one idle period based on the ranking. The one or more processors may adjust the original generation time of the key frame to be adjusted, so that the transmission period of the adjusted key frame is in the middle of the longest idle period. In response to determining that there is no idle period, the one or more processors may adjust the original generation time of the remaining of the collision key frames, so that the transmission period of the at least one adjusted collision key frame are evenly distributed in the hash period.

In some embodiments, the one or more processors may determine an adjustment instruction based on the adjusted generation time of the at least one adjusted collision key frame. The one or more processors may send the adjustment instruction to at least one of the plurality of acquisition device corresponding to the at least one adjusted collision key frame.

In some embodiments, to determine the adjustment instruction based on the adjusted generation time of the at least one adjusted collision key frame, the one or more processors may determine a time difference between the original generation time and the adjusted generation time of the at least one adjusted collision key frame. The one or more processors may determine the adjustment instruction based on the time difference.

In some embodiments, to send the adjustment instruction to the at least one of the plurality of acquisition device corresponding to the at least one adjusted collision key frame, the one or more processors may send the adjustment instruction to the at least one of the plurality of acquisition device corresponding to the at least one adjusted collision key frame. The adjustment instruction may cause the at least one of the plurality of acquisition device to generate the target key frame by delaying or advancing the time difference relative to the original generation time of the target key frame.

In some embodiments, to send the adjustment instruction to the at least one of the plurality of acquisition device corresponding to the at least one adjusted collision key frame, the one or more processors may send the adjustment instruction to the at least one of the plurality of acquisition device corresponding to the at least one adjusted collision key frame at a time point that is earlier or later than the original generation time by the time difference. The adjustment instruction may cause the at least one of the plurality of acquisition device to generate the target key frame immediately after receiving the adjustment instruction.

In some embodiments, the parameter information of each of the plurality of acquisition device may further include a channel identification and a device identification of the acquisition device.

In some embodiments, the system may be implemented on at least one of: an online platform that communicates with a display via a first network node and communicates with the plurality of acquisition devices via a second network node, the display, the first network node, or the second network node.

According to yet another aspect of the present disclosure, a system may include one or more storage devices and one or more processors configured to communicate with the one or more storage devices. The one or more storage devices may include a set of instructions. When the one or more processors executing the set of instructions, the one or more processors may be directed to perform one or more of the following operations. The one or more processors may determine whether an adjustment instruction is received from a back-end device, the adjustment instruction including an adjusted generation time of a key frame of the video data. In response to determining that an adjustment instruction is received from the back-end device, the one or more processors may generate the key frame based on the adjusted generation time in the adjustment instruction. In response to determining that no adjustment instruction is received from the back-end device, the one or more processors may generate the key frame based on an original generation time of the key frame.

According to yet another aspect of the present disclosure, a method for identifying a road feature may include one or more of the following operations. One or more processors may determine whether an adjustment instruction is received from a back-end device, the adjustment instruction including an adjusted generation time of a key frame of the video data. In response to determining that an adjustment instruction is received from the back-end device, the one or more processors may generate the key frame based on the adjusted generation time in the adjustment instruction. In response to determining that no adjustment instruction is received from the back-end device, the one or more processors may generate the key frame based on an original generation time of the key frame.

According to yet another aspect of the present disclosure, a system may include an obtaining module configured to determine whether an adjustment instruction is received from a back-end device, the adjustment instruction including an adjusted generation time of a key frame of the video data. The system may also include a generation module configured to: in response to determining that an adjustment instruction is received from the back-end device, generate the key frame based on the adjusted generation time in the adjustment instruction; or in response to determining that no adjustment instruction is received from the back-end device, generate the key frame based on an original generation time of the key frame.

According to yet another aspect of the present disclosure, a non-transitory computer readable medium may comprise at least one set of instructions. The at least one set of instructions may be executed by one or more processors of a computing device. The one or more processors may determine whether an adjustment instruction is received from a back-end device, the adjustment instruction including an adjusted generation time of a key frame of the video data. In response to determining that an adjustment instruction is received from the back-end device, the one or more processors may generate the key frame based on the adjusted generation time in the adjustment instruction. In response to determining that no adjustment instruction is received from the back-end device, the one or more processors may generate the key frame based on an original generation time of the key frame.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 6 is a flowchart illustrating an exemplary process for detecting key frame collision according to some embodiments of the present disclosure;

FIG. 7 is a flowchart illustrating an exemplary process for detecting key frame collision according to some embodiments of the present disclosure;

FIG. 9 is a flowchart illustrating an exemplary process for collision key frame adjustment according to some embodiments of the present disclosure;

FIG. 12 is a schematic flowchart illustrating an exemplary process for data transmission according to other embodiments of the present disclosure;

FIG. 13 is a schematic flowchart illustrating an exemplary process for data transmission according to some embodiments of the present disclosure;

FIG. 14 is a schematic flowchart illustrating an exemplary process for determining idle periods according to some embodiments of the present disclosure;

DETAILED DESCRIPTION

Figure 1:
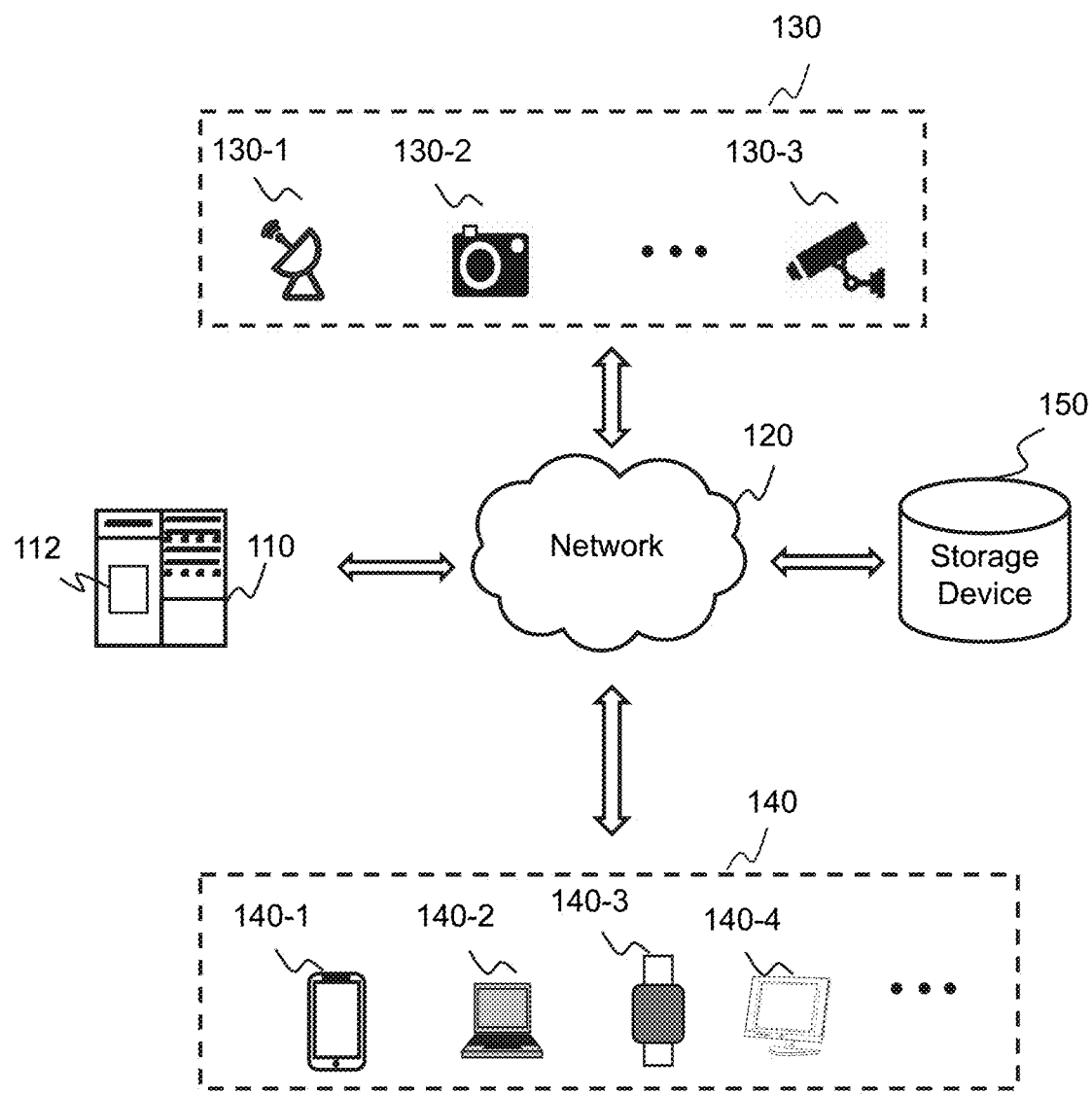
FIG. 1 is a schematic diagram illustrating an exemplary data transmission system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the terms "system," "engine," "unit," "module," and/or "block" used herein are one method to distinguish different components, elements, parts, sections, or assemblies of different levels in ascending order. However, the terms may be displaced by other expression if they may achieve the same purpose.

Generally, the words "module," "unit," or "block" used herein, refer to logic embodied in hardware or firmware, or to a collection of software instructions. A module, a unit, or a block described herein may be implemented as software and/or hardware and may be stored in any type of non-transitory computer-readable medium or other storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 220 illustrated in FIG. 2) may be provided on a computer readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules (or units or blocks) may be included in connected logic components, such as gates and flip-flops, and/or can be included in programmable units, such as programmable gate arrays or processors. The modules (or units or blocks) or computing device functionality described herein may be implemented as software modules (or units or blocks), but may be represented in hardware or firmware. In general, the modules (or units or blocks) described herein refer to logical modules (or units or blocks) that may be combined with other modules (or units or blocks) or divided into sub-modules (or sub-units or sub-blocks) despite their physical organization or storage.

It will be understood that when a unit, an engine, a module, or a block is referred to as being "on," "connected to," or "coupled to" another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

In addition, it should be understood that in the description of the present disclosure, the terms "first", "second", or the like, are only used for the purpose of differentiation, and cannot be interpreted as indicating or implying relative importance, nor can be understood as indicating or implying the order.

The flowcharts used in the present disclosure illustrate operations that systems implement according to some embodiments of the present disclosure. It is to be expressly understood, the operations of the flowcharts may be implemented not in order. Conversely, the operations may be implemented in an inverted order, or simultaneously. Moreover, one or more other operations may be added to the flowcharts. One or more operations may be removed from the flowcharts.

An aspect of the present disclosure provides methods and/or systems for detecting key frame collision. When a new acquisition device (e.g., an Internet protocol camera) is connected to a back-end device (e.g., a server or a network), the new acquisition device may be assigned to a group based on the communication way between the new acquisition device and the back-end device. Parameter information and transmission information of all acquisition devices in the group may be obtained, target key frames of the acquisition devices in the group may be mapped into a plurality of slots, and collision key frames may be determined. After grouping and managing the acquisition devices, the acquisition devices may be used for key frame collision detection in small groups to improve the precision and accuracy of key frame collision detection. In addition, mapping the target key frames into the slots may further improve the accuracy of the key frame collision, thereby facilitating the adjustment of the coding of the acquisition devices that have key frame collision.

When mapping the target key frames into the slots, the methods and systems may further determine a modified slot based on arithmetic average processing and/or moving average processing to reduce the influence caused by the fluctuation of network transmission, so that the slot corresponding to the target key frame is more accurate, thereby improving the accuracy of the key frame collision detection.

Another aspect of the present disclosure provides methods and/or systems for detecting key frame collision. A back-end device in the present disclosure receives a plurality of key frames within a preset time range, which may trigger the I-frame timing scheduling function. The original generation time of at least collision key frame may be adjusted based on idle weights of a plurality of slots, so that the back-end device only receives one key frame within the preset time range. The above method may reduce the probability of key frame collision, so as to smooth the video resource network data and reduce the video frame loss and freezing.

Yet another aspect of the present disclosure is to provide methods and devices for data transmission, which may simplify the process of detecting key frame collision, and the process for adjusting the original generation time of the collision key frames, so that the front-end device and the back-end device may transmit and receive the key frames more evenly within a preset period.

The present disclosure may determine the collision key frames of which the transmission periods overlap with each other as the collision key frames, which may simplify the process of detecting the key frame collision. After determining whether there is the collision key frames, at least one collision key frame may be adjusted to obtain the adjusted generation time of the at least one adjusted key frame. The method may make the front-end device and the back-end device send and receive the key frames more evenly within a preset period, thereby reducing the probability of the key frame collision to improve the stability of data transmission between the front-end device and the back-end device.

FIG. 1 is a schematic diagram illustrating an exemplary data transmission system according to some embodiments of the present disclosure. As shown, the data transmission system 100 may include a server 110, a network 120, an acquisition device 130 (also referred to as a front-end device), a terminal device 140, and a storage device 150. The server 110, the terminal device 140, or the network 120 (e.g., a first network node via which the server 110 communicates with the terminal device 140 and a second network node via which the server 110 communicates with the acquisition device 130) may be also referred to as a back-end device in the present disclosure.

The server 110 may be a single server or a server group. The server group may be centralized or distributed (e.g., the server 110 may be a distributed system). In some embodiments, the server 110 may be local or remote. For example, the server 110 may access information and/or data stored in the acquisition device 130, the terminal device 140, and/or the storage device 150 via the network 120. As another example, the server 110 may be directly connected to the acquisition device 130, the terminal device 140, and/or the storage device 150 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 including one or more components illustrated in FIG. 2 of the present disclosure. In some embodiments, the server 110 may be an online platform, or a network video recorder (NVR).

In some embodiments, the server 110 may include a processing engine 112. The processing engine 112 may process information and/or data relating to image coding to perform one or more functions described in the present disclosure. For example, the processing engine 112 may receive video data from the acquisition device 130. The processing engine 112 may detect key frame collision of the video data. The processing engine 112 may adjust a generation time of a key frame of the video data in response to determining that there is key frame collision. The processing engine 112 may generate an instruction based on the adjusted generation time and transmit the instruction to the acquisition device 130. In some embodiments, the processing engine 112 may include one or more processing devices (e.g., single-core processing device(s) or multi-core processor(s)). Merely by way of example, the processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

In some embodiment, the server 110 may be unnecessary and all or part of the functions of the server 110 may be implemented by other components (e.g., the network 120, the terminal device 140) of the data transmission system 100. For example, the processing engine 112 may be integrated into the terminal device140 and the functions (e.g., performing detection of key frame collision) of the processing engine 112 may be implemented by the terminal device140.

The network 120 may facilitate exchange of information and/or data for the data transmission system 100. In some embodiments, one or more components (e.g., the server 110, the acquisition device 130, the terminal device 140, the storage device 150) of the data transmission system 100 may transmit information and/or data to other component(s) of the data transmission system 100 via the network 120. For example, the server 110 may receive video data from the acquisition device 130 via the network 120. As another example, the server 110 may transmit an instruction to the acquisition device 130. In some embodiments, the network 120 may be any type of wired or wireless network, or combination thereof. Merely by way of example, the network 120 may include a cable network (e.g., a coaxial cable network), a wireline network, an optical fiber network, a telecommunications network, an intranet, an Internet, a local area network (LAN), a wide area network (WAN), a wireless local area network (WLAN), a metropolitan area network (MAN), a public telephone switched network (PSTN), a Bluetooth network, a ZigBee network, a near field communication (NFC) network, or the like, or any combination thereof.

The acquisition device 130 may be configured to acquire an image (the "image" herein refers to a single image or a frame of a video). In some embodiments, the acquisition device 130 may include a sensor 130-1, a camera 130-2, a video recorder 130-3, etc. The camera 130-1 may include a gun camera, a dome camera, an integrated camera, a monocular camera, a binocular camera, a multi-view camera, an Internet protocol camera (IPC), or the like, or any combination thereof. The video recorder 130-2 may include a PC Digital Video Recorder (DVR), an embedded DVR, or the like, or any combination thereof. The sensor 130-1 may include an acceleration sensor (e.g., a piezoelectric sensor), a velocity sensor (e.g., a Hall sensor), a distance sensor (e.g., a radar, an infrared sensor), a steering angle sensor (e.g., a tilt sensor), a traction-related sensor (e.g., a force sensor), or the like, or any combination thereof. The image acquired by the acquisition device 130 may be a two-dimensional image, a three-dimensional image, a four-dimensional image, etc. In some embodiments, the acquisition device 130 may include a plurality of components each of which can acquire an image. For example, the acquisition device 130 may include a plurality of sub-cameras that can capture images or videos simultaneously. In some embodiments, the acquisition device 130 may transmit the acquired image to one or more components (e.g., the server 110, the terminal device 140, the storage device 150) of the data transmission system 100 via the network 120.

The terminal device 140 may be configured to receive information and/or data from the server 110, the acquisition device 130, and/or the storage device 150 via the network 120. In some embodiments, the terminal device 140 may provide a user interface via which a user may view information and/or input data and/or instructions to the data transmission system 100. For example, the server 110 may receive video data from the acquisition device 130, and a user may view the video data via the user interface in real time. As another example, a user may input an instruction associated with the video data via the user interface. In some embodiments, the terminal device 140 may include a mobile phone 140-1, a computer 140-2, a wearable device 140-3, a monitor 140-4, or the like, or any combination thereof. In some embodiments, the terminal device 140 may include a display that can display information in a human-readable form, such as text, image, audio, video, graph, animation, or the like, or any combination thereof. The display of the terminal device 140 may include a cathode ray tube (CRT) display, a liquid crystal display (LCD), a light emitting diode (LED) display, a plasma display panel (PDP), a three dimensional (3D) display, or the like, or a combination thereof. In some embodiments, the terminal device 140 may be connected to one or more components (e.g., the server 110, the acquisition device 130, the storage device 150) of the data transmission system 100 via the network 120.

The storage device 150 may be configured to store data and/or instructions. The data and/or instructions may be obtained from, for example, the server 110, the acquisition device 130, and/or any other component of the data transmission system 100. In some embodiments, the storage device 150 may store data and/or instructions that the server 110 may execute or use to perform exemplary methods described in the present disclosure. In some embodiments, the storage device 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

The storage device 150 may be configured to store data and/or instructions. For example, the storage device 150 may store data and/or instructions that the server 110 may execute or use to perform exemplary methods described in the present disclosure. In some embodiments, the storage device 150 may be connected to the network 120 to communicate with one or more components (e.g., the server 110, the acquisition device 130, the terminal device 140) of the data transmission system 100. One or more components of the data transmission system 100 may access the data or instructions stored in the storage device 150 via the network 120. In some embodiments, the storage device 150 may be directly connected to or communicate with one or more components (e.g., the server 110, the acquisition device 130, the terminal device 140) of the data transmission system 100. In some embodiments, the storage device 150 may be part of other components of the data transmission system 100, such as the server 110, the acquisition device 130, or the terminal device 140.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 2:
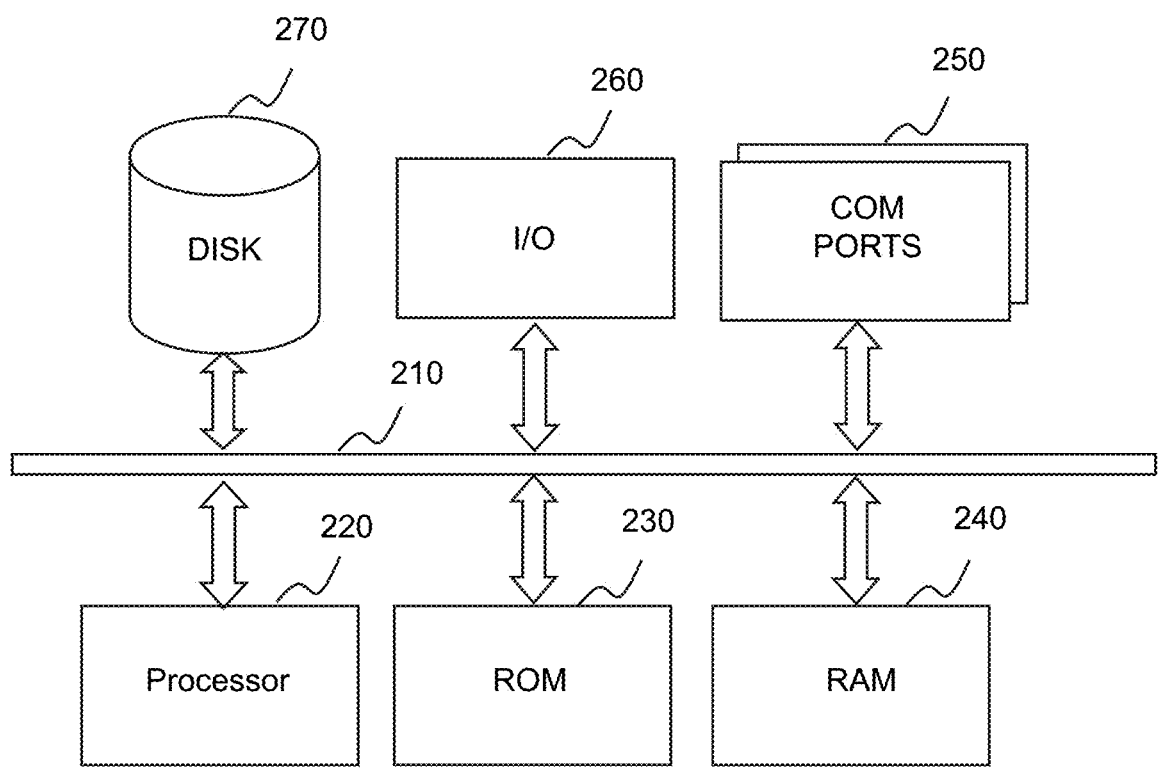
FIG. 2 is a schematic diagram illustrating exemplary hardware and/or software components of an exemplary computing device according to some embodiments of the present disclosure.

FIG. 2 is a schematic diagram illustrating exemplary hardware and/or software components of an exemplary computing device according to some embodiments of the present disclosure. In some embodiments, the server 110, the network 120, the terminal device 140, or the acquisition device 130 may be implemented on the computing device 200. For example, the processing engine 112 may be implemented on the computing device 200 and configured to perform functions of the processing engine 112 disclosed in this disclosure.

The computing device 200 may be used to implement any component of the data transmission system 100 as described herein. For example, the processing engine 112 may be implemented on the computing device 200, via its hardware, software program, firmware, or a combination thereof. Although only one such computer is shown, for convenience, the computer functions relating to image coding as described herein may be implemented in a distributed fashion on a number of similar platforms to distribute the processing load.

The computing device 200, for example, may include COM ports 250 connected to and from a network connected thereto to facilitate data communications. The computing device 200 may also include a processor (e.g., a processor 220), in the form of one or more processors (e.g., logic circuits), for executing program instructions. For example, the processor 220 may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The computing device 200 may further include program storage and data storage of different forms including, for example, a disk 270, a read-only memory (ROM) 230, or a random-access memory (RAM) 240, for storing various data files to be processed and/or transmitted by the computing device 200. The computing device 200 may also include program instructions stored in the ROM 230, RAM 240, and/or another type of non-transitory storage medium to be executed by the processor 220. The methods and/or processes of the present disclosure may be implemented as the program instructions. The computing device 200 may also include an input/output (I/O) component 260, supporting input/output between the computing device 200 and other components. The computing device 200 may also receive programming and data via network communications.

Merely for illustration, only one processor is illustrated in FIG. 2. Multiple processors 220 are also contemplated; thus, operations and/or method steps performed by one processor 220 as described in the present disclosure may also be jointly or separately performed by the multiple processors. For example, if in the present disclosure the processor 220 of the computing device 200 executes both operation A and operation B, it should be understood that operation A and operation B may also be performed by two different processors 220 jointly or separately in the computing device 200 (e.g., a first processor executes operation A and a second processor executes operation B, or the first and second processors jointly execute operations A and B).

Figure 3:
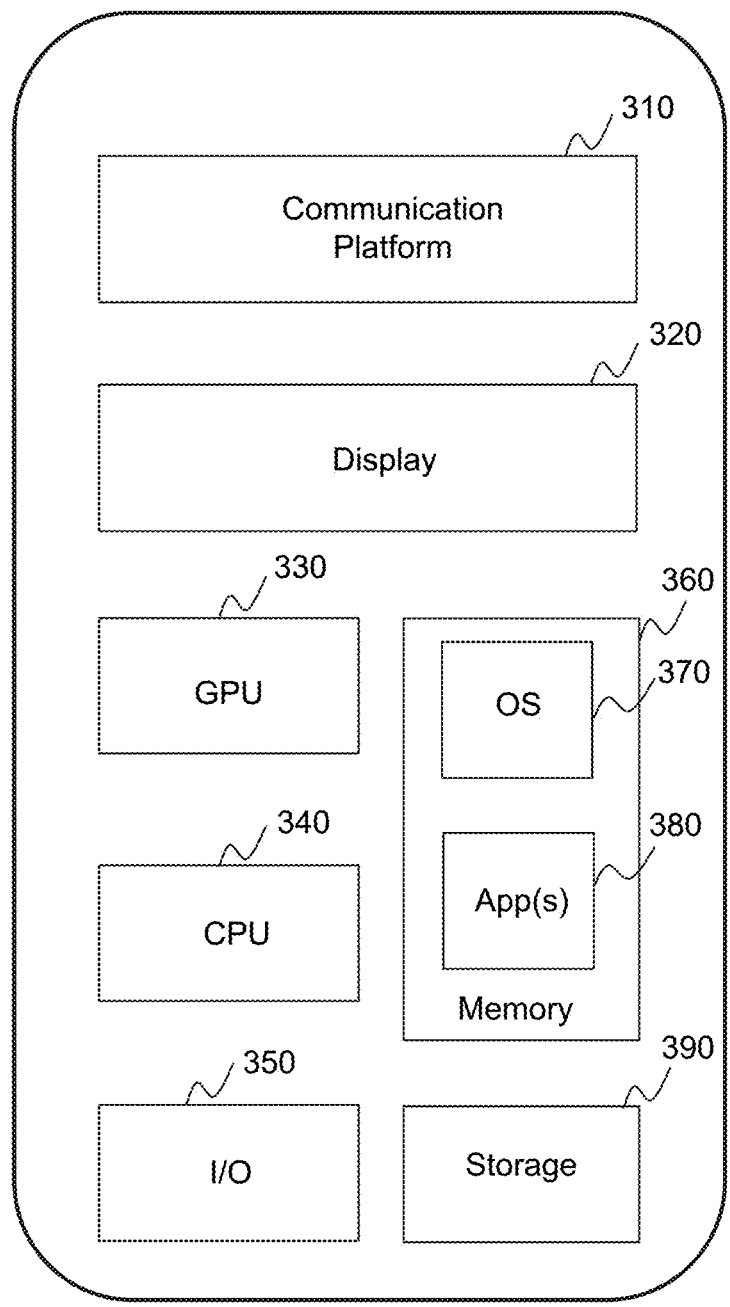
FIG. 3 is a schematic diagram illustrating exemplary hardware and/or software components of an exemplary terminal device according to some embodiments of the present disclosure.

FIG. 3 is a schematic diagram illustrating exemplary hardware and/or software components of an exemplary terminal device according to some embodiments of the present disclosure. In some embodiments, the terminal device 140 may be implemented on the terminal device 300 shown in FIG. 3.

As illustrated in FIG. 3, the terminal device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the terminal device 300.

In some embodiments, an operating system 370 (e.g., iOS™, Android™, Windows Phone™) and one or more applications (Apps) 380 may be loaded into the memory 360 from the storage 390 in order to be executed by the CPU 340. The applications 380 may include a browser or any other suitable mobile apps for receiving and rendering information relating to image coding or other information from the processing engine 112. User interactions may be achieved via the I/O 350 and provided to the processing engine 112 and/or other components of the data transmission system 100 via the network 120.

Figure 4:
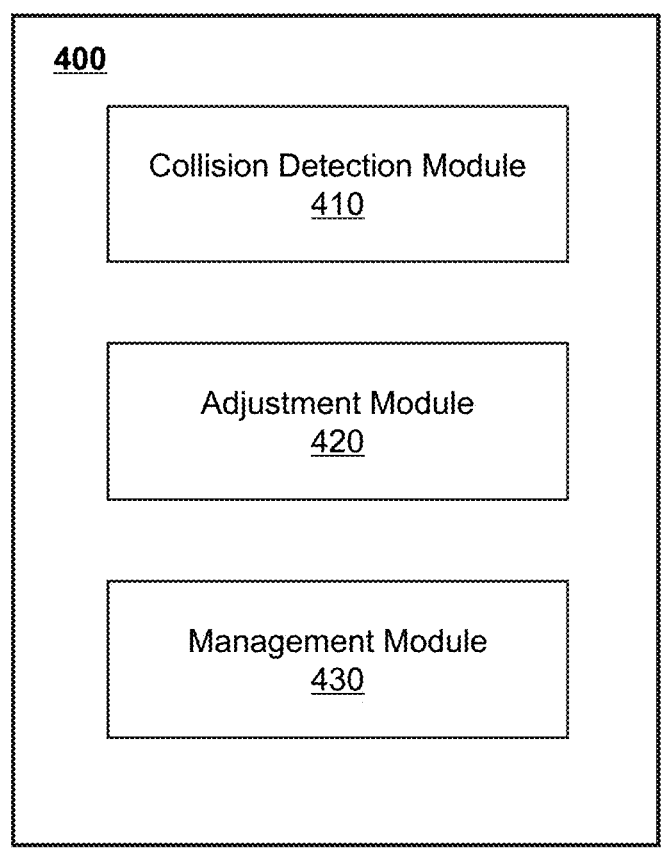
FIG. 4 is a schematic diagram illustrating an exemplary processing device according to some embodiments of the present disclosure.

FIG. 4 is a schematic diagram illustrating an exemplary processing device according to some embodiments of the present disclosure. In some embodiments, the processing engine 112 and/or the network 120 may be implemented on the processing device 400 shown in FIG. 4. The processing device 400 may include a collision detection module 410, an adjustment module 420, and a management module 430.

The collision detection module 410 may be configured to obtain parameter information of a plurality of acquisition devices that communicate with the system to transmit video data to the system. The parameter information of each of the plurality of acquisition device may include transmission information of a target key frame of the video data of the acquisition device.

The collision detection module 410 may be configured to determine, based on the parameter information, whether there are collision key frames in the target key frames of the plurality of acquisition devices.

The adjustment module 420 may be configured to adjust an original generation time of at least one of the collision key frames in response to determining that there are collision key frames, so that after the adjustment, there is no collision key frame in the target key frames of the plurality of acquisition devices.

The management module 430 may be configured to determine an adjustment instruction based on the adjusted generation time of the at least one adjusted collision key frame. The management module 430 may be configured to send the adjustment instruction to at least one of the plurality of acquisition device corresponding to the at least one adjusted collision key frame.

The modules and units in the processing device 400 may be connected to or communicated with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the processing device 400 may further include a storage module (not shown in FIG. 4). The storage module may be configured to store data generated during any process performed by any component of in the processing device 400. As another example, each of components of the processing device 400 may correspond to a storage module, respectively. Additionally or alternatively, the components of the processing device 400 may share a common storage module. As still another example, the decoding module may be omitted.

In the field of video compression, a video frame may be compressed using different algorithms. These different algorithms may divide the compressed (or encoded) video frames into different frame types, such as I frame, P frame, and B frame.

The I frame (also referred to as intra-coded frame or key frame) may be a complete image and don't require other video frames to decode. The P frame may hold the changes in the image from the previous frame and use data from the previous frame to decompress. The P frame may be more compressible than the I frame. The B frame may hold differences between the current frame and both the preceding and following frames to specify the current frame's content and use data from the preceding and following frames to decompress. The B frame may be more compressible than the P frame. P and B frames may be also called inter frames.

A group of pictures (GOP) is a collection of successive frames within a coded video stream. A GOP specifies the order in which the intra frame (e.g., the I frame) and the inter frames (e.g., the B frame and/or the P frame) are arranged. A coded video stream may include a plurality of successive GOPs.

Figure 5:
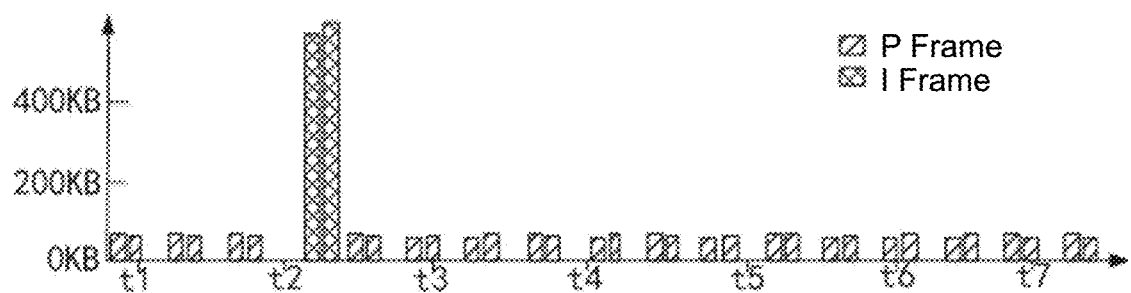
FIG. 5 is a schematic diagram illustrating exemplary key frame collision according to some embodiments of the present disclosure.

FIG. 5 is a schematic diagram illustrating exemplary key frame collision according to some embodiments of the present disclosure.

Key frame collision (also referred to as I frame collision) refers to that a back-end device (e.g., the server 110 or the network 120) receives a plurality of key frames from front-end devices (e.g., the acquisition device 130) at the same time or in a relatively short time period.

Merely by way of example, as shown in FIG. 5, two acquisition devices (e.g., two IPCs) may communicate with the server 110 via the network 120 to transmit video data (e.g., coded video streams) to the server 110. The coded video streams from the acquisition devices may include I frames and P frames. The horizontal axis represents the time when the I frames and the P frames reach the server 110 or the network 120. The vertical axis represents the data amount of the I frames and the P frames. As shown in FIG. 5, when the server 110 or the network 120 receives the I frames from the two acquisition devices at the same time or in a relatively short time period, I frame collision may appear as instantaneous network bursts on the network 120. Due to the limited resources of the network 120, the greater the probability of I frame collision is, the greater the probability of the congestion of the network 120, the packet loss, and the increase of round trip time (RTT), which even causes video freezing.

FIG. 6 is a flowchart illustrating an exemplary process for detecting key frame collision according to some embodiments of the present disclosure. In some embodiments, the process 600 may be implemented as a set of instructions (e.g., an application) stored in the storage ROM 230 or RAM 240. The server 110 or the network 120 (e.g., the processor 220, and/or the modules and/or the units in FIG. 4) may execute the set of instructions, and when executing the instructions, the server 110 or the network 120 may be configured to perform the process 600. The operations of the illustrated process presented below are intended to be illustrative. In some embodiments, the process 600 may be accomplished with one or more additional operations not described and/or without one or more of the operations herein discussed. Additionally, the order in which the operations of the process as illustrated in FIG. 6 and described below is not intended to be limiting.

In 610, the collision detection module 410 may obtain parameter information of a plurality of acquisition devices (e.g., the acquisition device 130) that communicate with a back-end device (e.g., the server 110 or the network 120) to transmit video data (e.g., coded video stream) to the back-end device. In some embodiments, the video data from an acquisition device may include a plurality of GOPs each of which includes a key frame. The parameter information of each of the plurality of acquisition device may include transmission information of a target key frame of the video data of the acquisition device. The target key frame of video data of an acquisition device may refer to one (e.g., an upcoming key frame reaching the server 110 or the network 120) of the key frames of the video data of the acquisition device.

In some embodiments, the transmission information of a target key frame may include a timestamp of the target key frame at which the back-end device will receives the target key frame, or a transmission period of the target key frame in which the target key frame will be transmitted from the corresponding acquisition device to the back-end device.

In some embodiments, the parameter information of an acquisition device may further include a size of a GOP of the video data from the acquisition device, an inter frame space (IFS) of the video data from the acquisition device, a frame rate of the video data from the acquisition device, a count of the plurality of acquisition devices, a video type of the video data from the acquisition device, a bit rate of the video data from the acquisition device, a channel identification of the acquisition device, a device identification of the acquisition device, or the like, or any combination thereof. The size of a GOP may indicate a count of frames in the GOP and/or the duration of the GOP. The size of GOP may indicate the time interval between two successive I frames of an acquisition device. The channel identification of the acquisition device refers to a channel through which video data is transmitted from the acquisition device to the back-end device. An acquisition device may have a unique device identification.

In 620, the acquisition module 420 may determine, based on the parameter information, whether there are collision key frames in the target key frames of the plurality of acquisition devices.

In some embodiments, the acquisition module 420 may determine a hash period based on the size of GOP. For example, the duration of the hash period may be equal to the size of the GOP. The acquisition module 420 may map the target key frames of the plurality of acquisition devices into the hash period based on the transmission information of the target key frames of the plurality of acquisition devices. The acquisition module 420 may determine, based on the mapping of the target key frames in the hash period, whether there are collision key frames in the target key frames of the plurality of acquisition devices.

In some embodiments, the acquisition module 420 may divide the hash period into a plurality of slots based on the size of GOP and the IFS. Each of the plurality of slots may include at least one IFS. The acquisition module 420 may map the target key frames of the plurality of acquisition devices into the plurality of slots of the hash period based on the timestamps of the target key frames. The acquisition module 420 may determine whether a second count of target key frames in one of the plurality of slots is larger than a second count threshold (e.g., 1, 2, 5, etc.). In response to determining that the second count of target key frames in one of the plurality of slots is larger than the second count threshold, the acquisition module 420 may determine the target key frames in the one of the plurality of slots as the collision key frames. Details regarding determining whether there are collision key frames based on the timestamps of the target key frames can be found elsewhere in present disclosure (e.g., in connection with FIG. 7 and FIG. 8).

In some embodiments, the acquisition module 420 may mapping the target key frames of the plurality of acquisition devices into the hash period by mapping the transmission periods of the target key frames into the hash period. The acquisition module 420 may determine, based on the mapping of the transmission periods, the target key frames that overlap with each other as the collision key frames. Details regarding determining whether there are collision key frames based on the transmission periods of the target key frames can be found elsewhere in present disclosure (e.g., in connection with FIG. 12).

In 630, in response to determining that there are collision key frames, the adjustment module 420 may adjust an original generation time of at least one of the collision key frames, so that after the adjustment, there is no collision key frame in the target key frames of the plurality of acquisition devices.

In some embodiments, the adjustment module 420 may determine one or more idle periods in the hash period based on the mapping of the target key frames in the hash period. A first count of target key frames in each of the one or more idle periods may be less than a first count threshold (e.g., 1, 2, etc.). For example, the first count of target key frames in each of the one or more idle periods may be zero. The adjustment module 420 may adjust an original generation time of at least one collision key frame, so that the at least one adjusted collision key frame is in the one or more idle periods.

In some embodiments, the adjustment module 420 may keep the original generation time of one of the collision key frames unchanged, and adjust the original generation time of the remaining of the collision key frames, so that the at least one adjusted collision key frame is in the one or more idle periods.

In some embodiments, the adjustment module 420 may adjust the original generation time of all of the collision key frames, so that the collision key frames are in the one or more idle periods.

In some embodiments, each of the one or more idle periods may correspond to one of the plurality of slots that is different from the slot corresponding to the collision key frames. For example, a slot includes three target key frames of which the count is larger than the second count threshold 1. The three target key frames may be determined as collision key frames. An idle slot refers to a slot including no target key frame. Two of the three target key frames may be adjusted to two idle slots, respectively. After the adjustment, there is no collision key frames.

In some embodiments, in response to determining that there is at least one idle slot, the adjustment module 420 may adjust at least one of the collision key frames to the at least one idle slot. In response to determining that there is no idle slot, the adjustment module 420 may adjust at least one of the collision key frames to one or more slots with the least number of target key frames. In some embodiments, the adjustment module 420 may adjust the original generation time of at least one collision key frame, so that after the adjustment, a third count of target key frames in the one of the plurality of slots is less than a third count threshold (e.g., 2, 3, etc.).

In some embodiments, the adjustment module 420 may adjust one target key frames in one time. Alternatively, the adjustment module 420 may adjust a plurality of target key frames in one time.

For example, a hash period includes 3 slots, such as slots 0-2. Three target kay frames are mapped into slot 2. Slots 0 and 1 include no target key frame, which indicates that slots 0 and 1 are idle slots. The count of target key frames in slot 2 is larger than the second count threshold of 1, which indicates that the three target key frames in slot 2 are collision target frames. The adjustment module 420 may adjust two collision key frames to slots 0 and 1, respectively, in one time. Alternatively, the adjustment module 420 may first adjust a collision key frame to slot 0. Then, the adjustment module 420 may determine whether there is an idle slot after last adjustment, and adjust another collision key frame to slot 1.

Figure 10:
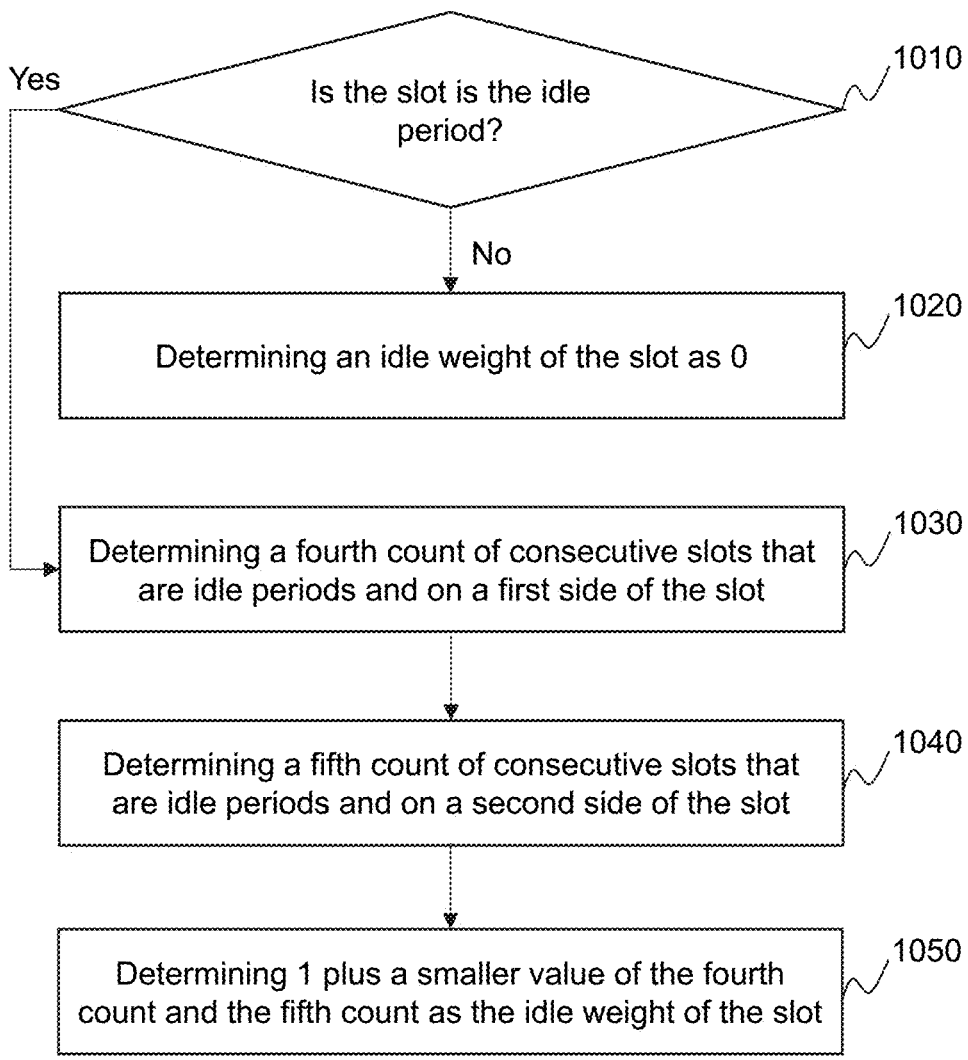
FIG. 10 is a flowchart illustrating an exemplary process for determining an idle weight of one of a plurality of slots according to some embodiments of the present disclosure.
Figure 11:
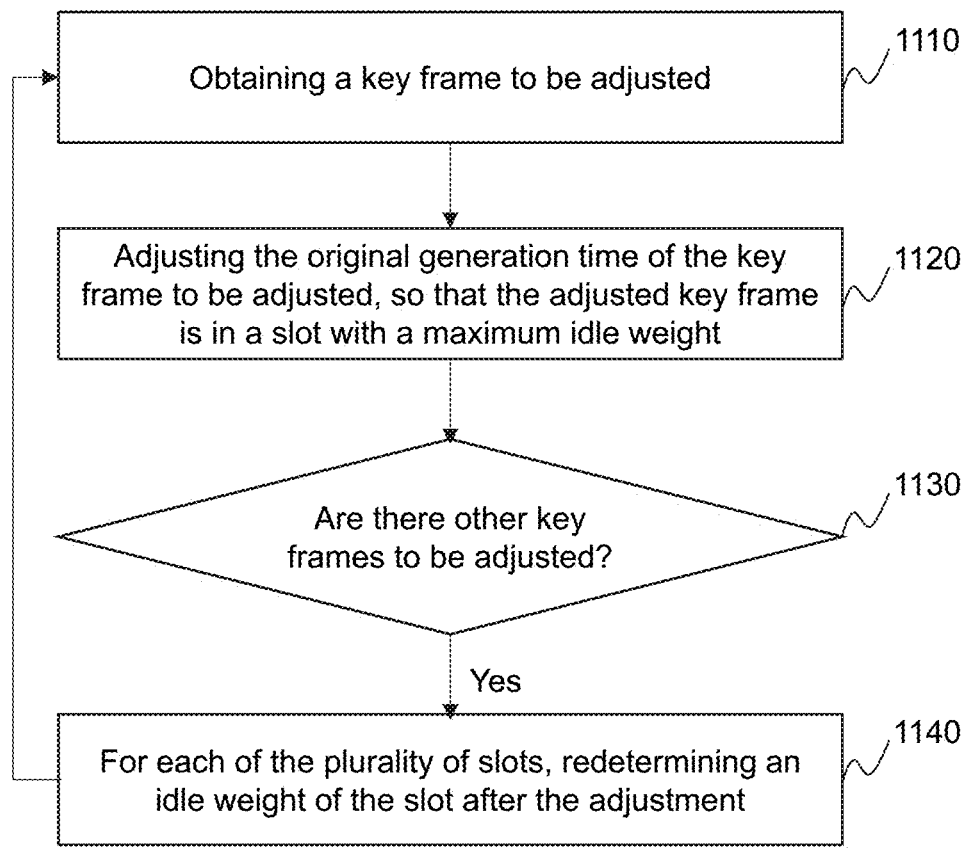
FIG. 11 is a flowchart illustrating an exemplary process for adjusting an original generation time of a target key frame according to some embodiments of the present disclosure.

Details regarding adjusting the collision key frames to the one or more idle slots can be found elsewhere in present disclosure (e.g., in connection with FIGS. 9-11).

In some embodiments, each of the one or more idle periods may be located between two transmission periods. For example, two transmission periods may overlap with each other in the hash period. The corresponding two target key frames may be determined as collision key frames. One of the two target key frames may be adjusted to an idle period to remove the overlapping between the two target key frames. After the adjustment, there is no collision key frames. Details regarding adjusting the collision key frames to remove the overlapping can be found elsewhere in present disclosure (e.g., in connection with FIGS. 13-16C).

After determining that there is key frame collision, the back-end device may adjust the generation time of at least one collision key frame to remove the collision key frames, so as to improve the stability of data transmission between to the back-end device and the acquisition devices.

In some embodiments, the acquisition devices communicating with the server 110 via the network 120 may be divided into a plurality of groups based on communication ways between the acquisition devices and the server 110. The acquisition devices of which the communication ways with the server 110 are the same may be divided into a same group. The process 600 may be performed for each group.

In some embodiments, the acquisition devices connected to the same base station may belong to the same group, and the acquisition devices connected to the different base stations may belong to different groups. In some embodiments, the acquisition devices connected to the same wireless network may belong to the same group. In some embodiments, the acquisition devices connected to the same local area network via wired may belong to the same group.

For example, when an acquisition device is actively connected to the back-end device, the acquisition device may be divided into a group based on the communication way between the acquisition device and the back-end device. Registration information including a channel identification and a device identification of the acquisition device may be sent to the back-end device. The back-end device may obtain the registration information and then initiate real-time streaming to the acquisition device to receive the video data captured by the acquisition device. Then, the back-end device may obtain the parameter information from the video data of all acquisition devices in the group to perform the process 600 to detect key frame collision.

In some embodiments, when the back-end device cannot recognize the communication way of an acquisition device, a user may manually set a group for the acquisition device or put the acquisition device into a default group.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

FIG. 7 is a flowchart illustrating an exemplary process for detecting key frame collision according to some embodiments of the present disclosure. In some embodiments, the process 700 may be implemented as a set of instructions (e.g., an application) stored in the storage ROM 230 or RAM 240. The server 110 or the network 120 (e.g., the processor 220, and/or the modules and/or the units in FIG. 4) may execute the set of instructions, and when executing the instructions, the server 110 or the network 120 may be configured to perform the process 700. The operations of the illustrated process presented below are intended to be illustrative. In some embodiments, the process 700 may be accomplished with one or more additional operations not described and/or without one or more of the operations herein discussed. Additionally, the order in which the operations of the process as illustrated in FIG. 7 and described below is not intended to be limiting. In some embodiments, operation 620 in the process 600 in FIG. 6 may be performed based on the process 700.

In 710, the acquisition module 420 may divide the hash period into a plurality of slots based on the size of GOP and the IFS. Each of the plurality of slots may include at least one IFS.

In 720, the acquisition module 420 may map the target key frames of the plurality of acquisition devices into the plurality of slots of the hash period based on the timestamps of the target key frames.

In 730, the acquisition module 420 may determine whether a second count of target key frames in one of the plurality of slots is larger than a second count threshold (e.g., 1, 2, 5, etc.).

In 740, in response to determining that the second count of target key frames in one of the plurality of slots is larger than the second count threshold, the acquisition module 420 may determine the target key frames in the one of the plurality of slots as the collision key frames.

In some embodiments, the acquisition module 420 may determine a hash time interval based on the IFS. The acquisition module 420 may divide the hash period by the hash time interval. The acquisition module 420 may determine, as a hash array count, a first integer value that is equal to an integer part of the division. The acquisition module 420 may divide the hash period into the plurality of slots based on the hash time interval and the hash array count.

In some embodiments, for each of the target key frames, the acquisition module 420 may determine, in the plurality of slots of the hash period, an original slot of the target key frame based on the timestamp of the target key frame.

In some embodiments, the acquisition module 420 may determine a first remainder by dividing the timestamp of the target key frame by the hash period. The acquisition module 420 may determine a second integer value that is equal to an integer part of a division between the first remainder and the hash time interval. The acquisition module 420 may designate one of the plurality of slots of the hash period corresponding to the second integer value as the original slot of the target key frame.

In some embodiments, parameters of the plurality of acquisition devices such as a size of a GOP, an inter frame space (IFS), a frame rate, a bit rate may be the same. Therefore, the timestamps of the target key frames of the plurality of acquisition devices may be mapped in a time period equal to a GOP.

In some embodiments, the hash time interval may be preset by a user, and the hash time interval may include at least one IFS. For example, the user may set the hash time interval to 2 IFSs.

In some embodiments, the hash time interval may be determined based on the IFS, the size of GOP, and the count of the plurality of acquisition devices.

In some embodiments, when the ratio of the size of GOP to the count of the plurality of acquisition devices is less than or equal to the IFS, the hash time interval may be determined as one IFS. When the ratio of the size of GOP to the count of the plurality of acquisition devices is greater than the IFS and less than the IFS multiplying a second value, the hash time interval may be determined by rounding the ratio of the size of GOP to the count of the plurality of acquisition devices. When the ratio of the size of GOP to the count of the plurality of acquisition devices exceeds the IFS multiplying the second value, the hash time interval may be determined as the IFS multiplying the second value. The second value may be an integer greater than 1 and related to the IFS. The longer the IFS is, the smaller the second value may be.

In some embodiments, when the count of the plurality of acquisition devices is relatively large, the hash time interval may be set as including at least one IFS to ensure that a target key frame can be mapped into a slot. When the count of the plurality of acquisition devices is moderate, the hash period may be divided equally according to the count of the plurality of acquisition devices. When the count of the plurality of acquisition devices is relatively small, an upper limit of the hash time interval may be set so that the target key frames can be mapped into the hash period and achieve a better mapping result, and the probability of key frame collision in the same slot may not be increased due to a large hash time interval, which affects the accuracy of key frame collision analysis. Therefore, dynamically adjusting the hash time interval according to the count of the plurality of acquisition devices, the size of GOP, and the IFS may help improve the accuracy of key frame collision detection result.

In some embodiments, the size of GOP is 2 s, and the frame rate is 25 frames/second, the IFS is 40 ms, and the second value is 3. When the count of the plurality of acquisition devices is greater than or equal to 50, the hash time interval may be set as 40 ms. When the count of the plurality of acquisition devices is between 17 and 50, the hash time interval may be set as the integer value of the size of GOP divided by the count of the plurality of acquisition devices. When the count of the plurality of acquisition devices is less than 17, the hash interval may be set as 120 ms.

In some embodiments, the hash period may be denoted as HashTimeGop, the hash time interval may be denoted as HashTimeInterval, the hash array count (a count of the plurality of slots in the hash period) may be denoted as HashArrayCnt, and the plurality of slots may be numbered from 0. The acquisition module 420 may designate a slot of which the serial number is equal to the second integer value as the original slot of the target key frame.

For example, HashArrayCnt=[HashTimeGop/HashTimeInterval]. The original slot of a target key frame may be determined based on: Slot=[(Timestamp % HashTimeGop)/HashTimeInterval], wherein Timestamp denotes the timestamp of the target key frame, and Slot denotes the original slot corresponding to the target key frame.

Merely by way of example, the size of the GOP is 2000 milliseconds (ms), the frame rate is 25 frames per second, and the IFS is 40 milliseconds (ms), so the hash period is 2000 milliseconds (ms), the hash time interval is set as 80 milliseconds (ms), and the hash array count is 25. The hash period may be divided into 25 slots that are numbered from 0, e.g., slots 0, 1, 2, . . . , 24. For a target key frame of which the timestamp is 7 s, the first remainder value is [7000 ms %2000 ms]=1000 ms. The second integer value is [1000 ms/80 ms]=12. Therefore, the target key frame with the timestamp of 7 s may be mapped in slot 12, that is, the original slot of the target key frame is slot 12.

It should be understood that a target key frame with any timestamp may be accurately mapped into a slot through the above method, and it is accurate and simple to determine the original slot for a target key frame through the above method.

In some embodiments, the acquisition module 420 may determine a second remainder by dividing the second integer value by the hash array count. The acquisition module 420 may determine whether the second integer value is equal to the second remainder. In response to determine that the second integer value is equal to the second remainder, the acquisition module 420 may determine the second integer value as being effective. In response to determine that the second integer value is not equal to the second remainder, the acquisition module 420 may determine the second integer value as being non-effective.

In some embodiments, after the second integer value is obtained, theoretically, the second integer value does not exceed the hash array count, and the second integer value may be the serial number of the slot in which the target key frame is mapped into. However, to improve the accuracy of the mapping result and prevent the abnormal mapping result, a second remainder value may be obtained by dividing the second integer value by the hash array count. If the mapping result is normal, the second integer value and the second remainder value may be equal. Therefore, it is necessary to determine whether the second integer value and the second remainder value are equal. When the second integer value and the second remainder value are equal, the second integer value may be determined to be valid. In this way, the abnormal result may be prevented from being used to map the target key frame into the hash period, and improve the accuracy of the mapping result.

In some embodiments, to map a target key frame into the plurality of slots of the hash period based on the timestamp of the target key frame, the acquisition module 420 may further determine, in the plurality of slots of the hash period, a modified slot of the target key frame based on the original slot and a first slot of a previous key frame immediately prior to the target key frame.

In some embodiments, due to the fluctuation of network transmission, the time for a target key frame to reach the back-end device may be not constant. Therefore, there may be a certain error in the original slot. For acquisition devices that are mapped into adjacent slots, the key frame collision may occur due to the fluctuation of network transmission during the actual transmission of the video data to the back-end device. Therefore, the original slot of a target key frame and the slot corresponding to other key frames before the target key frame may be used to determine a modified slot of the target key frame to reduce errors caused by the fluctuation of network transmission. Details regarding determining the modified slot can be found elsewhere in present disclosure (e.g., in connection with FIG. 8).

In some embodiments, the second count threshold may be preset based on the peak value of the data received by the back-end device, for example, the second count threshold may be set to 2 or 3. In some embodiments, after obtaining the parameter information, the back-end device may analyze the data volume of the key frame based on the bit rate and the size of GOP, and then determine, as the second count threshold, the integer value of the peak value of the data volume received by the back-end device divided by the data volume of the key frame.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 8:
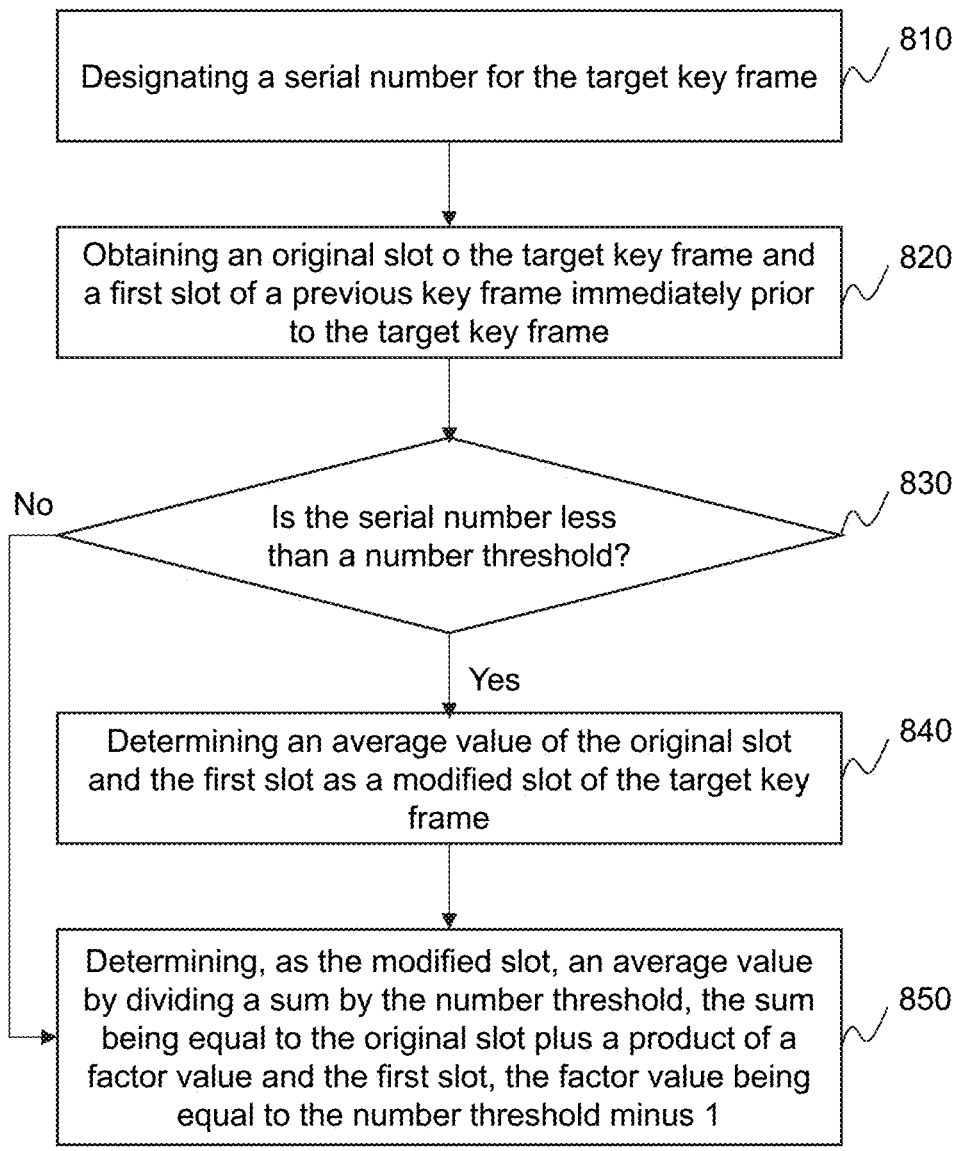
FIG. 8 is a flowchart illustrating an exemplary process for determining a modified slot according to some embodiments of the present disclosure.

FIG. 8 is a flowchart illustrating an exemplary process for determining a modified slot according to some embodiments of the present disclosure. In some embodiments, the process 800 may be implemented as a set of instructions (e.g., an application) stored in the storage ROM 230 or RAM 240. The server 110 or the network 120 (e.g., the processor 220, and/or the modules and/or the units in FIG. 4) may execute the set of instructions, and when executing the instructions, the server 110 or the network 120 may be configured to perform the process 800. The operations of the illustrated process presented below are intended to be illustrative. In some embodiments, the process 800 may be accomplished with one or more additional operations not described and/or without one or more of the operations herein discussed. Additionally, the order in which the operations of the process as illustrated in FIG. 8 and described below is not intended to be limiting. In some embodiments, operation 720 in the process 700 in FIG. 7 may be performed based on the process 800.

In 810, the acquisition module 420 may designate a serial number for the target key frame.

In 820, the acquisition module 420 may obtain an original slot of the target key frame and a first slot of a previous key frame immediately prior to the target key frame.

In 830, the acquisition module 420 may compare the serial number with a number threshold.

In some embodiments, the acquisition module 420 may determine, in the plurality of slots of the hash period, a modified slot of the target key frame based on the comparison, the original slot, and the first slot of the previous key frame of the target key frame.

In 840, in response to determining that the serial number is less than the number threshold, the acquisition module 420 may determine an average value of the original slot and the first slot (e.g., an average value of the serial numbers of the original slot and the first slot) as the modified slot. The acquisition module 420 may determine one of the plurality of slots in the hash period of which the serial number is equal to the average value as the modified slot.

In 850, in response to determining that the serial number is larger than or equal to the number threshold, the acquisition module 420 may determine, as the modified slot, an average value by dividing a sum by the number threshold. The sum may be equal to the original slot (e.g., the serial number of the original slot) plus a product of a factor value and the first slot (e.g., the serial number of the original slot). The factor value may be equal to the number threshold minus 1. The acquisition module 420 may determine one of the plurality of slots in the hash period of which the serial number is equal to the average value as the modified slot.

In some embodiments, the back-end device may record the key frames of the same acquisition device during the process of real-time streaming and number the key frames in the order of the timestamps.

In some embodiments, the mapping result of the previous key frame before the current key frame (the target key frame) may be stored in a storage device (e.g., the storage device 150, the ROM 230, the RAM 240, etc.) of the data transmission system 100. In some embodiments, the original slot corresponding to the target key frame may be obtained according to the above description in the process 700 in FIG. 7, and the first slot corresponding to the previous key frame immediately prior to the target key frame may be obtained from the storage device.

In some embodiments, the number threshold may be 10. The number threshold may be configured to perform arithmetic average processing on the original slot and the first slot when the count of key frames is small, and perform moving average processing on the original slot and the first slot when the count of key frames is greater than the number threshold.

In some embodiments, assuming that the serial number of the target key frame is i, the original slot of the target key frame is represented by $S_i$, the modified slot of the target key frame is represented by $M_i$, and the number threshold is 10, when i<10, the modified slot of the target key frame may be determined based on Equation (1) below:

$$M_i = [M_{(i-1)} + S_i]/2 \tag{1},$$

wherein $M_{(i-1)}$ denotes the first slot (e.g., the modified slot) of the previous key frame i−1 immediately prior to the target key frame i. The average value of the original slot and the first slot may be rounded as the modified slot of the target key frame.

In some embodiments, assuming that the serial number of the target key frame is i, the original slot of the target key frame is represented by $S_i$, the modified slot of the target key frame is represented by $M_i$, and the number threshold is 10, when i≥10, the modified slot of the target key frame may be determined based on Equation (2) below:

$$M_i = [(T_n - 1) * M_{(i-1)} + S_i]/T_n \tag{2},$$

The average value obtained by dividing a sum by the number threshold $T_n$ may be rounded to obtain the modified slot of the target key frame. The sum may be equal to the original slot plus a product of a factor value and the first slot, and the factor value may be equal to the number threshold minus 1, e.g., $T_n - 1$.

It should be understood that in some embodiments, the number threshold may be omitted, and the acquisition module 420 may perform the arithmetic average processing in operation 840 or the moving average processing in operation 850. No matter what process is adopted, determining a modified slot using the original slot and the slot corresponding to the previous key frame may effectively reduce the error of the original slot, and reduce the impact caused by the fluctuation of network transmission.

In some embodiments, after determining the modified slot, the acquisition module 420 may obtain a second slot of a subsequent key frame immediately after the target key frame. The acquisition module 420 may determine a difference between the second slot and the modified slot (e.g., a difference between the serial numbers of the second slot and the modified slot). The acquisition module 420 may determine whether the difference is larger than or equal to a difference threshold. In response to determining that the difference is larger than or equal to the difference threshold, the acquisition module 420 may number the key frames after the target key frame starting from the subsequent key frame.

In some embodiments, assuming that the serial number of the target key frame is i, the second slot (e.g., the original slot) of the subsequent key frame i+1 immediately after the target key frame i is represented by $S_{(i+1)}$, the modified slot of the target key frame is represented by $M_i$, and the difference threshold is 2, when the difference between the second slot $S_{(i+1)}$ and $M_i$ is greater than 2, the acquisition module 420 may number the key frames after the target key frame starting from the subsequent key frame.

In some embodiments, when the difference between the second slot and the modified slot is greater than the difference threshold, the subsequent key frame may be pulled again or a user may manually pull the subsequent key frame due to communication with the back-end device of one or more new acquisition devices. Therefore, the key frames after the target key frame needs to be renumbered, and the process 800 may be repeated to modify the original slots of the key frame after the target key frame to improve the reliability of modifying the original slot.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

FIG. 9 is a flowchart illustrating an exemplary process for collision key frame adjustment according to some embodiments of the present disclosure. In some embodiments, the process 900 may be implemented as a set of instructions (e.g., an application) stored in the storage ROM 230 or RAM 240. The server 110 or the network 120 (e.g., the processor 220, and/or the modules and/or the units in FIG. 4) may execute the set of instructions, and when executing the instructions, the server 110 or the network 120 may be configured to perform the process 900. The operations of the illustrated process presented below are intended to be illustrative. In some embodiments, the process 900 may be accomplished with one or more additional operations not described and/or without one or more of the operations herein discussed. Additionally, the order in which the operations of the process as illustrated in FIG. 9 and described below is not intended to be limiting. In some embodiments, operation 630 in the process 600 in FIG. 6 may be performed based on the process 900. In some embodiments, when the process 900 is used to implement operation 630, operation 620 may be performed based on the process 700.

In 910, for each of a plurality of slots of the hash period, the adjustment module 420 may determine an idle weight of the slot based on whether the slot and one or more adjacent slots of the slot are the idle periods.

In 920, the adjustment module 420 may adjust the original generation time of at least one collision key frame, so that the at least one adjusted collision key frame is in at least one of the one or more idle periods of which the idle weight is larger than a weight threshold.

In some embodiments, operation 910 may be performed based on the process in FIG. 10. FIG. 10 is a flowchart illustrating an exemplary process for determining an idle weight of one of a plurality of slots according to some embodiments of the present disclosure.

In some embodiments, the process 1000 may be implemented as a set of instructions (e.g., an application) stored in the storage ROM 230 or RAM 240. The server 110 or the network 120 (e.g., the processor 220, and/or the modules and/or the units in FIG. 4) may execute the set of instructions, and when executing the instructions, the server 110 or the network 120 may be configured to perform the process 1000. The operations of the illustrated process presented below are intended to be illustrative. In some embodiments, the process 1000 may be accomplished with one or more additional operations not described and/or without one or more of the operations herein discussed. Additionally, the order in which the operations of the process as illustrated in FIG. 10 and described below is not intended to be limiting.

In the process 1000, a process for determining an idle weight of one of the plurality of slots of the hash period is taken as an example. The idle weights of other slots of the plurality of slots may be determined based on a process similar to the process 1000.

In some embodiments, in the plurality of slots, a first end slot at a first end of the hash period may be deemed to be adjacent to a second end slot at a second end of the hash period.

In 1010, the adjustment module 420 may determine whether the slot is the idle period.

In 1020, in response to determining that the slot is not the idle period, the adjustment module 420 may determine the idle weight of the slot as 0.

In 1030, in response to determining that the slot is the idle period, the adjustment module 420 may determine a fourth count of consecutive slots that are idle periods and on a first side of the slot.

In 1040, the adjustment module 420 may determine a fifth count of consecutive slots that are idle periods and on a second side of the slot.

In 1050, the adjustment module 420 may determine 1 plus a smaller value of the fourth count and the fifth count as the idle weight of the slot.

Table 1 illustrated the slots corresponding to the target key frame timestamps of three acquisition devices.

TABLE 1

| Acquisition device | Timestamp | Slot |
|---|---|---|
| IPC-1 | X | 1 |
| IPC-2 | X + 80 ms | 1 |
| IPC-3 | X + 500 ms | 5 |

As shown in Table 1, there are three IPC devices connected to the back-end device, namely IPC-1, IPC-2, and IPC-3, respectively. The target key frame timestamps of the three IPCs in Table 1 may be mapped into a hash period including the following parameters: a hash period of 2 s, a hash time interval of 120 ms, and a hash array count of 16. The slots corresponding to the target key frame timestamps of IPC-1 and IPC-2 are slot 1, and the slot corresponding to the target key frame timestamp of IPC-3 is slot 5. The snapshot of the key frame hash slots of the three IPCs is shown in Table 2 below, and slot 0 and slot 15 in Table 2 are deemed to be adjacent to each other.

TABLE 2

| | Slot | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| Count of I frame | 0 | 2 | 0 | 0 | 0 | 1 | 0 | 0 | 0 | 0 | 0 | 0 | 0 | 0 | 0 | 0 |

In some embodiments, referring to Table 2 above, assuming that the current slot is slot 1, since slot 1 includes two I frames, which indicates that slot 1 is not an idle period, the idle weight corresponding to slot 1 is set as 0. Assuming that the current slot is slot 5, since slot 5 includes one I frame, which indicates that slot 5 is not an idle period, the idle weight corresponding to slot 5 is set as 0.

In some embodiments, referring to Table 2 above, assuming that the current slot is slot 0, since there is no I frame in slot 0, slot 0 may be determined as an idle period. The count of consecutive slots that are idle periods (e.g., including no I frames) on a first side (e.g., the left side as shown in Table 2) of slot 0 is as 10 (i.e., slot 15 to slot 6). The count of consecutive slots that are idle periods (e.g., including no I frame) on a second side (e.g., the right side as shown in Table 2) of the slot 0 is 0. The idle weight of slot 0 may be min(10,0)+1, which denotes 1. The 1 in "+1" above represents slot 0 itself.

In some embodiments, the adjustment module 420 may determine whether the slot is at the first end or the second end of the hash period. In response to determining that the slot is not at the first end or the second end of the hash period, the adjustment module 420 may determine the idle weight of another slot of the plurality of slots based on the process 1000.

In some embodiments, the idle weight of each slot may be sequentially determined in a left-to-right or right-to-left manner. Table 3 is a snapshot of I frame hash slots of the three IPC devices and the corresponding idle weights.

TABLE 3

| | Slot | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| Count of I frame | 0 | 2 | 0 | 0 | 0 | 1 | 0 | 0 | 0 | 0 | 0 | 0 | 0 | 0 | 0 | 0 |
| Idle weight | 1 | 0 | 1 | 2 | 1 | 0 | 1 | 2 | 3 | 4 | 5 | 6 | 5 | 4 | 3 | 2 |

In some embodiments, as shown in Table 3 above, the target key frame of IPC-1 or IPC-2 may be adjusted to a slot with an idle weight greater than a weight threshold, and the weight threshold may be 3, 4, 5, etc., which can be set according to the actual situation.

In some embodiments, when there is a plurality of collision key frames required to be adjusted, each of the plurality of collision key frames may be adjusted to a slot with an idle weight greater than the weight threshold.

Alternatively, operation 920 may be performed based on the process 1100 in FIG. 11.

FIG. 11 is a flowchart illustrating an exemplary process for adjusting an original generation time of a target key frame according to some embodiments of the present disclosure.

In some embodiments, the process 1100 may be implemented as a set of instructions (e.g., an application) stored in the storage ROM 230 or RAM 240. The server 110 or the network 120 (e.g., the processor 220, and/or the modules and/or the units in FIG. 4) may execute the set of instructions, and when executing the instructions, the server 110 or the network 120 may be configured to perform the process 1100. The operations of the illustrated process presented below are intended to be illustrative. In some embodiments, the process 1100 may be accomplished with one or more additional operations not described and/or without one or more of the operations herein discussed. Additionally, the order in which the operations of the process as illustrated in FIG. 11 and described below is not intended to be limiting.

In 1110, the adjustment module 420 may obtain a key frame to be adjusted.

In 1120, the adjustment module 420 may adjust the original generation time of the key frame to be adjusted, so that the adjusted key frame is in a slot with a maximum idle weight.

In 1130, the adjustment module 420 may determine whether there are other key frames to be adjusted.

In 1140, in response to determining that there is at least one other key frame to be adjusted, for each of the plurality of slots, the adjustment module 420 may redetermine an idle weight of the slot after the adjustment based on the process 1000 and obtain a new key frames to be adjusted. The adjustment module 420 may adjust the new key frame by repeating the process 1100.

In some embodiments, as shown in Table 3 above, the target key frame of IPC-1 or IPC-2 may be adjusted to slot 11.

In some embodiments, for the situation in Table 3 above, the snapshot of the adjusted I frame hash slots may be shown in Table 4 below. It can be found from Table 4 that there are no multiple I frames in the same slot in the snapshot of Table 4, indicating that there is no other key frame to be adjusted. In some embodiments, after the adjustment, there may still be multiple I frames in the same slot, and the process 1100 needs to be performed again at this time.

TABLE 4

| | Slot | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| Count of I frame | 0 | 1 | 0 | 0 | 0 | 1 | 0 | 0 | 0 | 0 | 0 | 1 | 0 | 0 | 0 | 0 |

In the above manner, the I frame timestamps of multiple acquisition devices can be distributed as evenly as possible, to achieve the purpose of avoiding the key frame collision in time for the acquisition devices.

In some embodiments, as shown in Table 4 above, assuming that the initial slot of IPC-3 denotes slot 1, the adjusted slot denotes slot 11, and the slot interval denotes 120 ms, then the IPC-3 I frame generation time needs to be delayed by (11-1)*120 ms=1200 ms.

Merely by way of example, taking the frame rate of 25 and the size of GOP of 2 seconds as an example, the original generation time of at least one collision key frame may be adjusted based on the process 900, the process 1000, and/or the process 1100 to remove key frame collision. Table 5 and Table 6 are schematic diagrams illustrated frame sequences before and after the adjustment, respectively.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

FIG. 12 is a schematic flowchart illustrating an exemplary process for data transmission according to other embodiments of the present disclosure. In some embodiments, the process 1200 may be implemented as a set of instructions (e.g., an application) stored in the storage ROM 230 or RAM 240. The server 110 or the network 120 (e.g., the processor 220, and/or the modules and/or the units in FIG. 4) may execute the set of instructions, and when executing the instructions, the server 110 or the network 120 may be configured to perform the process 1200. The operations of the illustrated process presented below are intended to be illustrative. In some embodiments, the process 1200 may be accomplished with one or more additional operations not described and/or without one or more of the operations herein discussed. Additionally, the order in which the operations of the process as illustrated in FIG. 12 and described below is not intended to be limiting.

In 1210, the collision detection module 410 may obtain transmission periods of target key frames of a plurality of acquisition devices connected to the back-end device, and determine the target key frames of which the transmission periods overlaps with each other as collision key frames.

In some embodiments, the back-end device may initiate real-time streaming to the acquisition devices to receive the video data captured by the acquisition devices. The back-end device may obtain parameter information of the plurality of acquisition devices. The parameter information may be transmitted to the back-end device from the acquisition devices directly or via the network 120. The transmission period of a target key frame may include a transmission time when the target key frame is transmitted from the corresponding acquisition device, and a receiving time when the target key frame is received by the back-end device.

In some embodiments, the collision detection module 410 may determine, based on the parameter information, whether key frame collision occurs within a preset time range, and determine the target key frames of which the transmission periods overlap with each other as the collision key frame. If the key frame collision occurs, the collision

TABLE 5

| | Frame No. | | | | | | | | | | | | | | | | | | | | | | | | |
|---|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
| IPC-1 | I | P | P | P | P | P | P | P | P | P | P | P | P | P | P | P | P | P | P | P | P | P | P | P | P |
| IPC-2 | P | P | P | P | I | P | P | P | P | P | P | P | P | P | P | P | P | P | P | P | P | P | P | P | P |
| IPC-3 | I | P | P | P | P | P | P | P | P | P | P | P | P | P | P | P | P | P | P | P | P | P | P | P | P |

TABLE 6

| | Frame No. | | | | | | | | | | | | | | | | | | | | | | | | |
|---|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
| IPC-1 | I | P | P | P | P | P | P | P | P | P | P | P | P | P | P | P | P | P | P | P | P | P | P | P | P |
| IPC-2 | P | P | P | P | I | P | P | P | P | P | P | P | P | P | P | P | P | P | P | P | P | P | P | P | P |
| IPC-3 | P | P | P | P | P | P | P | I | P | P | P | P | P | P | P | P | P | P | P | P | P | P | P | P | P | detection module 410 may mark the acquisition devices corresponding to the collision key frames as the collision acquisition devices and record the corresponding parameter information. If the key frame collision does not occur, the original generation time of the target key frames of the acquisition devices remains unchanged. The process of detecting key frame collision is simple, and the detection may be made immediately after the parameter information of the acquisition devices is obtained, which reduces the processing burden of the back-end device and improves the efficiency of the key frame collision detection.

In some embodiments, the acquisition devices may be connected with the network 120 and the server 110. The server 110 may initiate the real-time streaming to the acquisition devices, and the acquisition devices may transmit the video streams including the transmission periods of the target key frames to the network 120 or the server 110, then the network 120 or the server 110 may determine whether there are collision key frames based on the transmission periods of the target key frames included in the video streams of the acquisition devices.

In some embodiments, the acquisition devices may be connected with the network 120 and the server 110. The server 110 may initiate the real-time streaming to the acquisition devices, and the acquisition devices may transmit the video streams to the network 120. The network 120 may add the transmission periods to the target key frames in the video streams and forwards the video streams to the server 110. The server 110 may receive the video streams forwarded by the network 120 and the transmission periods of the target key frames in the video streams, and may further detect key frame collision.

In 1220, the adjustment module 420 may obtain an adjusted generation time of at least one of the collision key frame by adjusting an original generation time of the at least one collision key frame.

In some embodiments, a preset period may be the entire or part of the period of the transmission of the video stream. For example, the video streams of the acquisition devices may be aligned according to the timestamps of the video streams, and the video data of a GOP in the video streams may be selected. One GOP may be determined as the preset period (e.g., the hash period), and a period in the preset period that does not include the target key frame and includes at least one IFS may be determined as an idle period.

In some embodiments, the count of the collision key frames may be determined according to the parameter information of the acquisition devices by the collision detection module 410. The idle periods of which the count is equal to the count of the collision key frames may be selected from a plurality of the idle periods. Each collision key frame may be adjusted to a corresponding idle period to optimize the key frame generation time of the collision key frame and reduce the probability of the key frame collision, and further, improve the real-time performance and stability of the key frame transmission.

In some embodiments, when the count of idle periods is less than the count of the collision key frames, an idle period with the longest time length among the idle periods may be obtained and a first difference between the count of the collision key frames and the count of the idle periods may be obtained. The longest idle period may be divided equally into a plurality of sections of which the count is equal to the first difference, and the collision key frames with a count of the first difference value may be adjusted to the equally divided sections, respectively.

In 1230, the management module 430 may transmit an adjustment instruction to the corresponding acquisition device according to the adjusted generation time of the at least one adjusted key frame.

In some embodiments, the time difference between the original generation time and the adjusted generation time of the adjusted key frame may be obtained. The adjustment instruction including the time difference may be transmitted to the corresponding acquisition device so that the acquisition device generates the target key frame by delaying or advancing the time difference relative to the original generation time of the target key frame.

In some embodiments, the original generation time and the adjusted generation time may be configured to obtain the time difference. The back-end device may generate the adjustment instruction including the time difference and immediately transmit the adjustment instruction to the acquisition device, to make the acquisition device record the above-mentioned time difference after receiving the adjustment instruction, then transmit the target key frame, so that the overlapping of the transmission periods of the target key frames is avoided, and the probability of key frame collision is reduced.

The present disclosure provides a method of data transmission based on a plurality of the acquisition devices provided. The target key frames of which the transmission periods overlap with each other may be determined as the collision key frames, which may simplify the process of the key frame collision detection. After determining that there are the collision key frames, the back-end device may adjust the original generation time of at least one collision key frame to obtain the adjusted generation time of the at least one adjusted key frame. According to the adjusted generation time, an adjustment instruction may be generated and transmitted to the corresponding acquisition device, so that the front-end device and the back-end device may transmit and receive the key frames more evenly within the preset period, and further, the probability of key frame collision may be reduced to improve the stability of transmission of the key frames between the front-end device and the back-end device.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

FIG. 13 is a schematic flowchart illustrating an exemplary process for data transmission according to some embodiments of the present disclosure. In some embodiments, the process 1300 may be implemented as a set of instructions (e.g., an application) stored in the storage ROM 230 or RAM 240. The server 110 or the network 120 (e.g., the processor 220, and/or the modules and/or the units in FIG. 4) may execute the set of instructions, and when executing the instructions, the server 110 or the network 120 may be configured to perform the process 1300. The operations of the illustrated process presented below are intended to be illustrative. In some embodiments, the process 1300 may be accomplished with one or more additional operations not described and/or without one or more of the operations herein discussed. Additionally, the order in which the operations of the process as illustrated in FIG. 13 and described below is not intended to be limiting.

In 1310, the collision detection module 410 may obtain transmission periods of target key frames of a plurality of acquisition devices connected to the back-end device, and determine the target key frames of which the transmission periods overlaps with each other as collision key frames.

In some embodiments, the transmission periods of the target key frames of the acquisition devices connected to the back-end device may be obtained. The transmission period of a target key frame may include a transmission time when the target key frame is transmitted from the corresponding acquisition device, and a receiving time when the target key frame is received by the back-end device. If the transmission time of a target key frame is within the transmission period of another target key frame, the two target key frames may be determined as collision key frames. The detection manner may make a detection immediately after obtaining the transmission periods of the target key frames, which may improve the efficiency of the collision key frame detection.

In 1320, the adjustment module 420 may obtain idle periods in the preset period.

In some embodiments, operation 1320 may be performed based on the process 1400 in FIG. 14.

FIG. 14 is a schematic flowchart illustrating an exemplary process for determining idle periods according to some embodiments of the present disclosure. In some embodiments, the process 1400 may be implemented as a set of instructions (e.g., an application) stored in the storage ROM 230 or RAM 240. The server 110 or the network 120 (e.g., the processor 220, and/or the modules and/or the units in FIG. 4) may execute the set of instructions, and when executing the instructions, the server 110 or the network 120 may be configured to perform the process 1400. The operations of the illustrated process presented below are intended to be illustrative. In some embodiments, the process 1400 may be accomplished with one or more additional operations not described and/or without one or more of the operations herein discussed. Additionally, the order in which the operations of the process as illustrated in FIG. 14 and described below is not intended to be limiting.

In 1410, the adjustment module 420 may obtain the parameter information of the acquisition devices connected to the back-end device, wherein the parameter information may include the transmission periods of the target key frames and the size of GOP.

In some embodiments, when there are collision key frames, the parameter information of the acquisition devices that have been connected to the back-end device may be obtained, wherein the parameter information of the acquisition devices may include the transmission periods of the target key frames and the size of GOP.

In 1420, the adjustment module 420 may map the transmission periods of the target key frames into a hash period equal to size of GOP to extract idle periods in the hash period.

In some embodiments, the size of GOP of the acquisition devices may be constant. The video stream of each acquisition device may be aligned according to the timestamps of the video stream, and further, the transmission periods may be mapped into the hash period. The period in the hash period that does not include target key frames and includes at least one IFS may be determined as an idle period.

In some embodiments, the back-end device may initiate simultaneous streaming to the currently connected acquisition devices and the streaming parameters may be the same, and the timestamps of the video streams of the acquisition devices may be aligned. Assuming that the transmission time of the target key frames of the acquisition devices denotes time, and the hash period denotes HasgTimeGop, the target key frames may be mapped into the hash period based on Equation (3) below:

$$\text{Period} = \text{time} \% \text{ HashTimeGOP} \quad (3),$$

wherein Perioddenotes the transmission periods of the target key frames after mapping. For example, the size of GOP denotes 2 s, and the original generation time of a key frame in a first GOP IS 50 ms, then the original generation time of the key frame in the subsequent GOP denotes 50 ms+n*2 s. By taking the GOP as the hash period, and mapping the transmission periods of the target key frames to the hash period, the idle periods may be extracted in the hash period to obtain stable and accurate idle periods relative to the GOP, which may improve the accuracy of obtaining the idle periods.

In 1330, the adjustment module 420 may obtain an adjusted generation time of at least one of the collision key frames by adjusting the original generation time of the at least one collision key frame so that the at least one adjusted key frame is in at least one idle period.

In some embodiments, the original generation time of at least one collision key frame may be adjusted to make the at least one adjusted key frame is in at least one idle period, so that the back-end device may receive the key frames more evenly.

In some embodiments, the original generation time of one of the collision key frames may be kept unchanged, the original generation time of the remaining collision key frames may be adjusted to the midpoint of at least one idle period to obtain the adjusted generation time of the remaining collision key frame.

In some embodiments, the parameter information may be obtained. The key frame position of the collision key frames may be located within the hash period. The original generation time of one collision key frame may be kept unchanged, and a count of the remaining collision key frames may be obtained. Idle periods of which the count is equal to the count of the remaining collision key frames may be selected from all idle periods in the hash period, and each of the remaining collision key frames may be assigned to a corresponding idle period. The original generation time of the remaining collision key frames may be adjusted to make the adjusted key frame locate at the midpoint of the corresponding idle periods.

In some embodiments, when the count of all idle periods in the hash period is less than the count of the collision key frames, the original generation time of a part of the collision key frame may be adjusted firstly, and then, the adjustment module 420 may reacquire the idle periods in the hash period. The original generation time of the unadjusted collision key frames may be adjusted to make the key frames locate at the midpoint of the idle period in the current hash period. If there are still collision key frames that have not been adjusted, the adjustment module 420 may return to the operation of reacquiring the idle periods in the current hash period, until the original generation time of all of the remaining collision key frames is adjusted.

In some embodiments, the latest idle periods in the current hash period may be obtained, so that the adjustment of the original generation time of the collision key frames is updated in a timely manner. According to the latest idle periods in the current hash period, the original generation time of the collision key frames may be adjusted reasonably, which may make the transmission of the key frames more even within the hash period, reducing the probability of congestion and packet loss on the uplink.

In some embodiments, all idle periods may be ranked in an ascending or descending order according to the time length. The adjusted generation time of the remaining collision key frames may be obtained according to the time length of the idle periods.

In some embodiments, after all the idle periods in the hash period are obtained, an ascending or descending ranking may be performed according to the time length of the idle periods, to obtain the idle period with a longest time length among all the idle periods.

When the count of idle periods is greater than or equal to the count of collision key frames to be adjusted, the idle periods of which the count is equal to the count of the collision key frame to be adjusted, with longer time lengths, may be selected. The original generation time of the collision key frames may be adjusted to make the adjusted key frame locate at the midpoint of the corresponding idle period respectively. When adjusting the original generation time of the collision key frame, the collision key frames may be adjusted to a longer idle period, which may increase the interval between the key frames, and effectively reduce the probability of the key frame collision.

In some embodiments, when the count of idle periods is less than the count of collision key frames to be adjusted, the collision key frames of which the count is equal to the count of idle periods may be adjusted to the midpoint position of the corresponding idle periods. Then, the idle periods in the current hash period may be obtained again, and the newly obtained idle periods may be ranked in an ascending or descending order according to the time length. The above operations may be repeated until all the collision key frames to be adjusted are adjusted.

In 1340, the management module 430 may transmit an adjustment instruction to the corresponding acquisition device according to the adjusted generation time.

In some embodiments, the time difference between the original generation time and the adjusted generation time may be obtained. The adjustment instruction may be transmitted to the corresponding acquisition device by delaying or advancing the time difference relative to the original generation time of the target key frame, to make the acquisition device generate the target key frame immediately after receiving the adjustment instruction.

In some embodiments, the original generation time and the adjusted generation time may be configured to obtain the time difference. The back-end device may generate the adjustment instruction by advancing or delaying the time difference, and transmit the adjustment instruction to the acquisition device, so that the acquisition device immediately starts encoding and transmits the target key frame after receiving the adjustment instruction, further the acquisition device immediately executes the corresponding adjustment instruction after receiving the adjustment instruction, reducing other operation procedures of the acquisition device, and reducing the load of the acquisition device.

The main technical problem solved by the present disclosure is to provide methods and systems for data transmission. After determining whether there are collision key frames, the idle periods may be obtained from the hash period. The original generation time of one of the collision key frame may be kept unchanged. The original generation time of the remaining collision key frames may be adjusted, so that the transmission periods of the target key frames are staggered in the hash period, and the probability of the key frame collision is reduced.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 15:
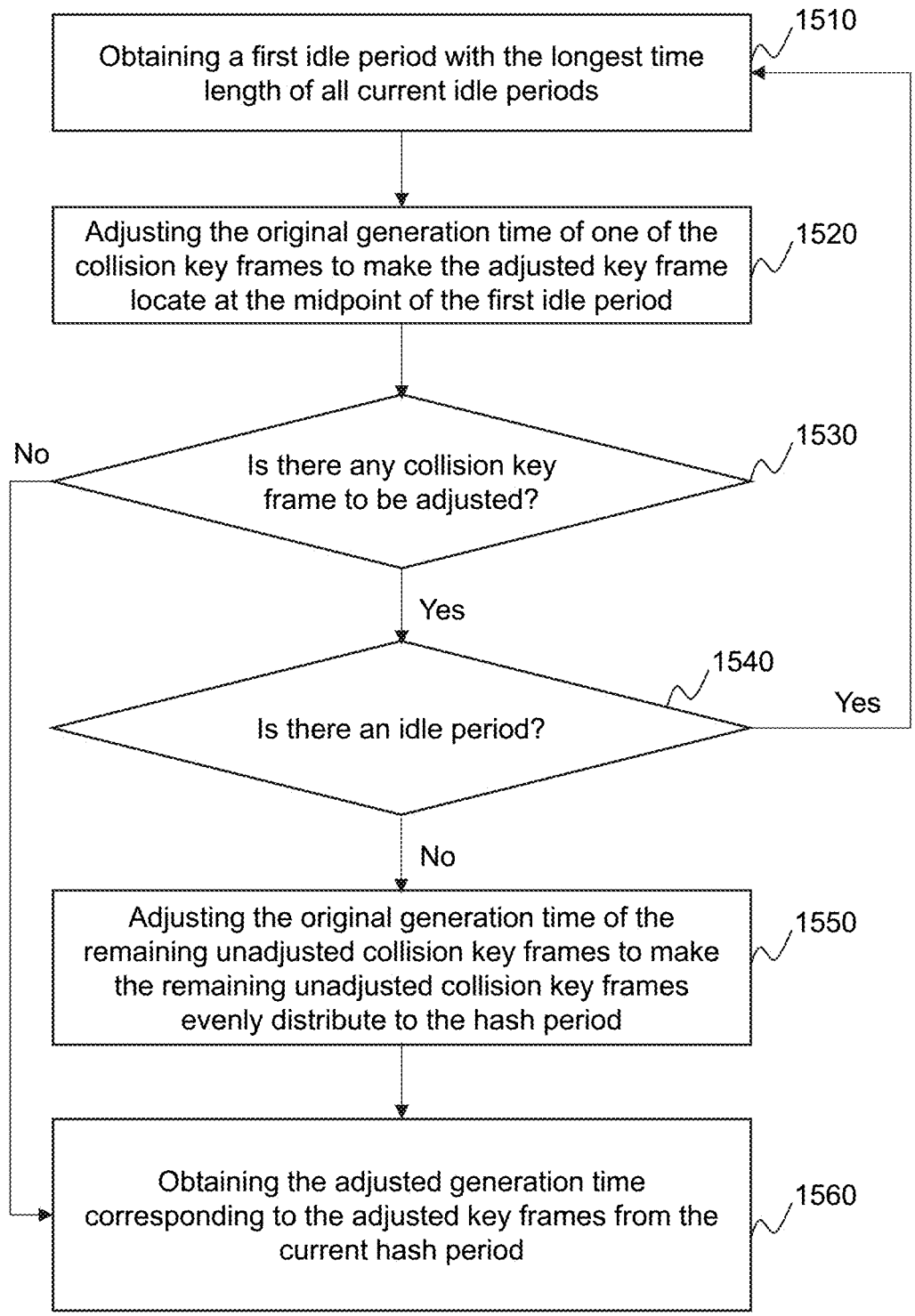
FIG. 15 is a schematic diagram illustrating an exemplary process for adjusting an original generation time of at least one collision key frame according to some embodiment of the present disclosure.

FIG. 15 is a schematic diagram illustrating an exemplary process for adjusting an original generation time of at least one collision key frame according to some embodiment of the present disclosure. In some embodiments, the process 1500 may be implemented as a set of instructions (e.g., an application) stored in the storage ROM 230 or RAM 240. The server 110 or the network 120 (e.g., the processor 220, and/or the modules and/or the units in FIG. 4) may execute the set of instructions, and when executing the instructions, the server 110 or the network 120 may be configured to perform the process 1500. The operations of the illustrated process presented below are intended to be illustrative. In some embodiments, the process 1500 may be accomplished with one or more additional operations not described and/or without one or more of the operations herein discussed. Additionally, the order in which the operations of the process as illustrated in FIG. 15 and described below is not intended to be limiting. In some embodiments, operation 1330 in the process 1300 in FIG. 13 may be performed based on the process 1500.

In 1510, the acquisition module 420 may obtain a first idle period with the longest time length of all current idle periods.

Figure 16A:
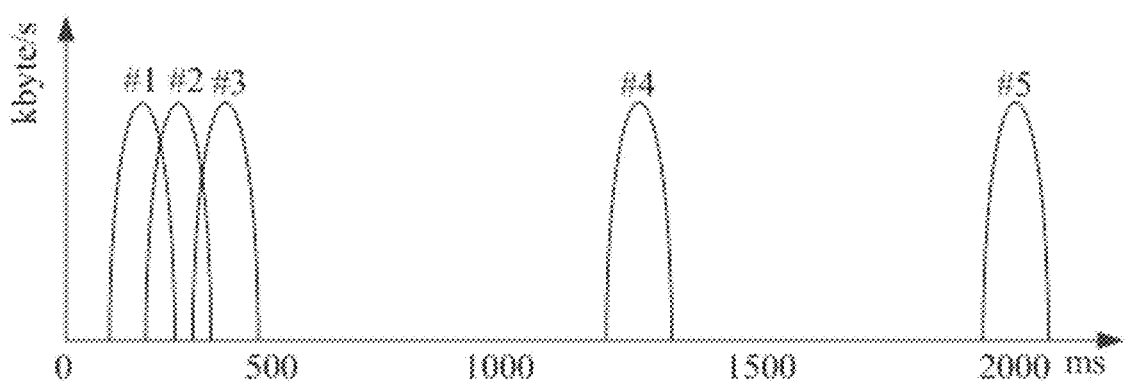
FIG. 16A is a schematic diagram illustrating an exemplary result of mapping target key frames into a hash period according to some embodiment of the present disclosure.

FIG. 16A is a schematic diagram illustrating an exemplary result of mapping target key frames into the hash period according to some embodiment of the present disclosure. The time length of an idle period may include at least one IFS, otherwise, it is deemed that there is no idle period. The first idle period with the longest time length may be selected from the idle periods in the hash period by ranking the idle periods in an ascending or descending order. As shown in FIG. 16A, the idle period between the acquisition device No. 1 and the acquisition device No. 4 is taken as the first idle period.

In 1520, the acquisition module 420 may adjust the original generation time of one of the collision key frames to make the adjusted key frame locate at the midpoint of the first idle period.

Figure 16B:
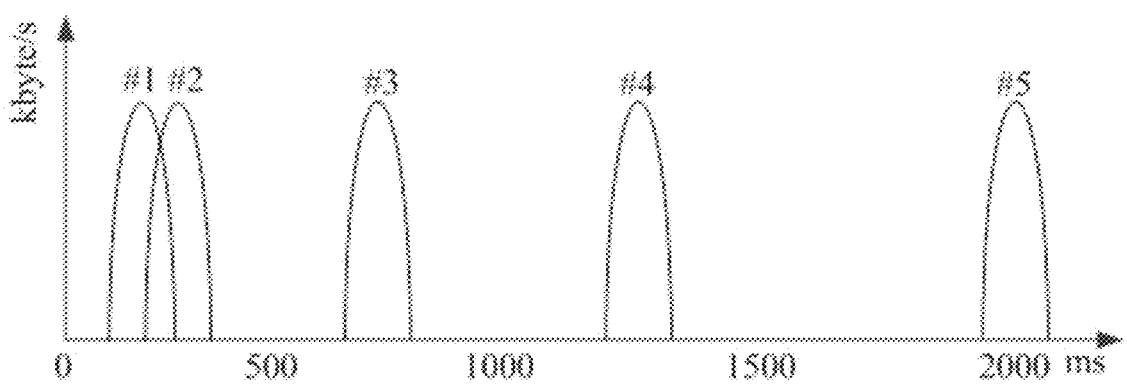
FIG. 16B is a schematic diagram illustrating an exemplary process for adjusting a target key frame according to some embodiment of the present disclosure.

FIG. 16B is a schematic diagram illustrating an exemplary process for adjusting a target key frame according to some embodiment of the present disclosure. The original generation time of one of the collision key frames may be adjusted to the first idle period. As shown in FIG. 16B, the original generation time of the target key frame of the acquisition device No. 3 may be adjusted to make the target key frame locate at the midpoint of the first idle period, so that the one of the collision key frames may obtain the optimal generation time.

In 1530, the acquisition module 420 may determine whether there is any collision key frame to be adjusted.

For example, as shown in FIG. 16B, the target key frame of the acquisition device No. 2 needs to be adjusted, and then the operation 1540 may be performed. If there is no collision key frame to be adjusted, then the operation 1560 may be performed.

In 1540, the acquisition module 420 may determine whether there is an idle period.

For example, the frame rate denotes 25 fps, and the time length of an idle period needs to be greater than or equal to 40 ms. If there is an idle period, the acquisition module 420 may return to the operation 1510 to obtain the first idle period with the longest time length among all current idle periods. As shown in FIG. 16B, the current first idle period is the idle period between the acquisition device No. 4 and the acquisition device No. 5.

Figure 16C:
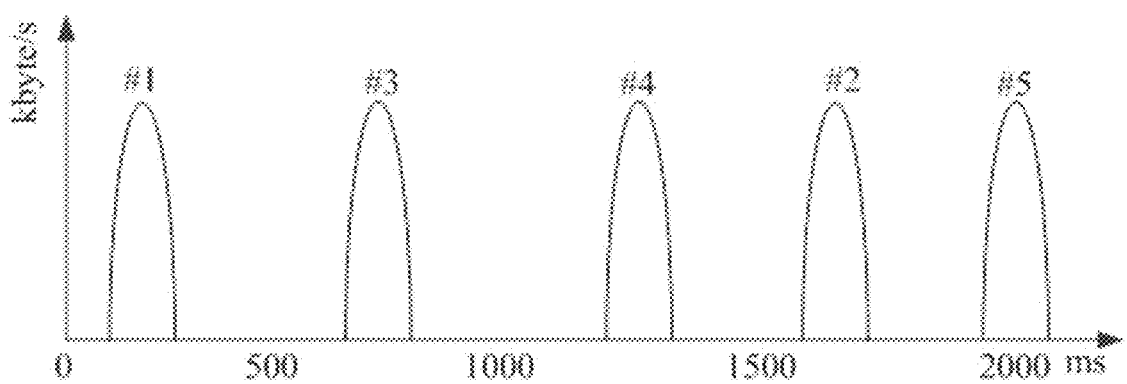
FIG. 16C is a schematic diagram illustrating an exemplary process for adjusting a target key frame according to some embodiment of the present disclosure.

In some embodiments, the target key frame of the acquisition device No. 2 may be adjusted to the midpoint position of the current first idle period to obtain the diagram shown in FIG. 16C.

In 1550, the acquisition module 420 may adjust the original generation time of the remaining unadjusted collision key frames to make the remaining unadjusted collision key frames evenly distribute to the hash period.

In some embodiments, when the count of the acquisition devices is large, which may result that there is still unadjusted collision key frames when there is no idle period, then the unadjusted collision key frames may be rearranged in the hash period so that the distribution of the key frames in the hash period is relatively uniform. As shown in FIG. 16A, when the hash period denotes 2000 ms and there are still three unadjusted collision key frames, the unadjusted collision key frames may be adjusted to 600 ms, 1200 ms, and 1800 ms, respectively, to make sure that even if the key frames has unavoidably collided in the hash period, the collision time nodes are evenly distributed within the hash period. The time nodes where the collision key frames occur may be dispersed as much as possible to reduce the probability of uplink congestion and video freezing.

In 1560, the acquisition module 420 may obtain the adjusted generation time corresponding to the adjusted key frames from the current hash period.

In some embodiments, through the adjustment of the above operations 1510-1550, each time the target key frame is adjusted, as long as there is an idle period, the latest first idle period with the longest time length may be obtained. Each time the target key frame is adjusted, the target key frame may be adjusted to the midpoint of the first idle period, so that the target key frame may be adjusted to the optimal position in the current hash period.

In some embodiments, even if there is no idle period in the current hash period, the unadjusted collision key frames may be scattered in the hash period to reduce the overlap of a plurality of the target key frames in a short period. The adjusted generation time corresponding to the adjusted collision key frames may be obtained according to the latest idle periods.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 17:
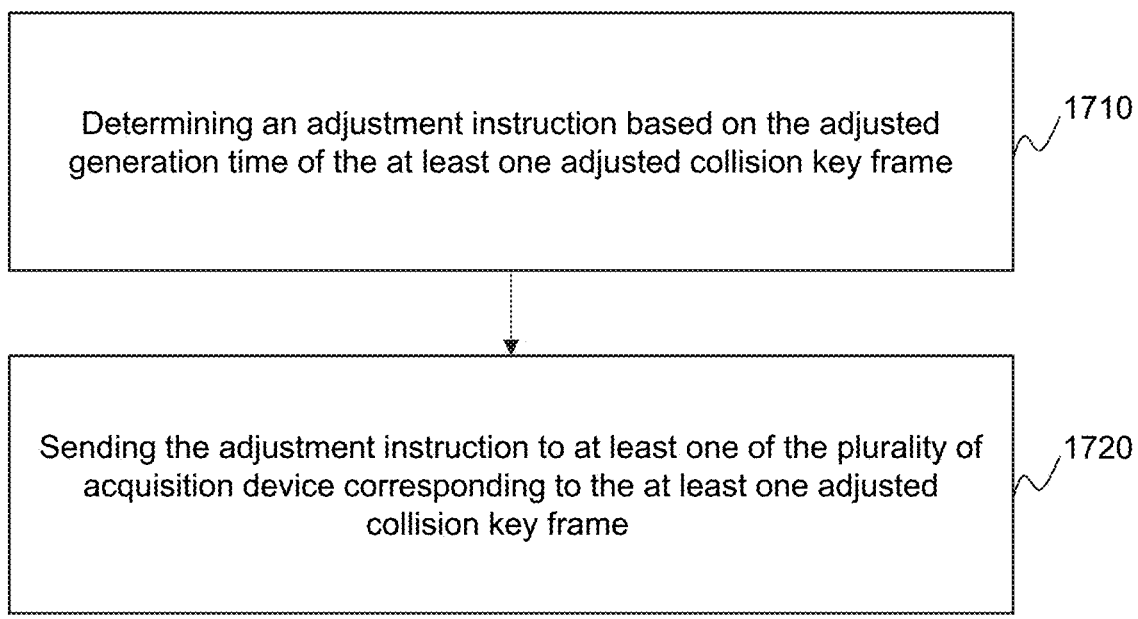
FIG. 17 is a flowchart illustrating an exemplary process for transmitting an adjustment instruction according to some embodiments of the present disclosure.

FIG. 17 is a flowchart illustrating an exemplary process for transmitting an adjustment instruction according to some embodiments of the present disclosure. In some embodiments, the process 1700 may be implemented as a set of instructions (e.g., an application) stored in the storage ROM 230 or RAM 240. The server 110 or the network 120 (e.g., the processor 220, and/or the modules and/or the units in FIG. 4) may execute the set of instructions, and when executing the instructions, the server 110 or the network 120 may be configured to perform the process 1700. The operations of the illustrated process presented below are intended to be illustrative. In some embodiments, the process 1700 may be accomplished with one or more additional operations not described and/or without one or more of the operations herein discussed. Additionally, the order in which the operations of the process as illustrated in FIG. 17 and described below is not intended to be limiting. In some embodiments, the process 1700 may be performed after the process 600.

In 1710, the management module 430 may determine an adjustment instruction based on the adjusted generation time of the at least one adjusted collision key frame.

In 1720, the management module 430 may send the adjustment instruction to at least one of the plurality of acquisition device corresponding to the at least one adjusted collision key frame.

In some embodiments, the management module 430 may determine a time difference between the original generation time and the adjusted generation time of the at least one adjusted collision key frame. The management module 430 may determine the adjustment instruction based on the time difference.

In some embodiments, the management module 430 may send the adjustment instruction to the at least one of the plurality of acquisition device corresponding to the at least one adjusted collision key frame. The adjustment instruction may cause the at least one of the plurality of acquisition device to generate the target key frame by delaying or advancing the time difference relative to the original generation time of the target key frame.

In some embodiments, the management module 430 may send the adjustment instruction to the at least one of the plurality of acquisition device corresponding to the at least one adjusted collision key frame at a time point that is earlier or later than the original generation time by the time difference. The adjustment instruction may cause the at least one of the plurality of acquisition device to generate the target key frame immediately after receiving the adjustment instruction.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 18:
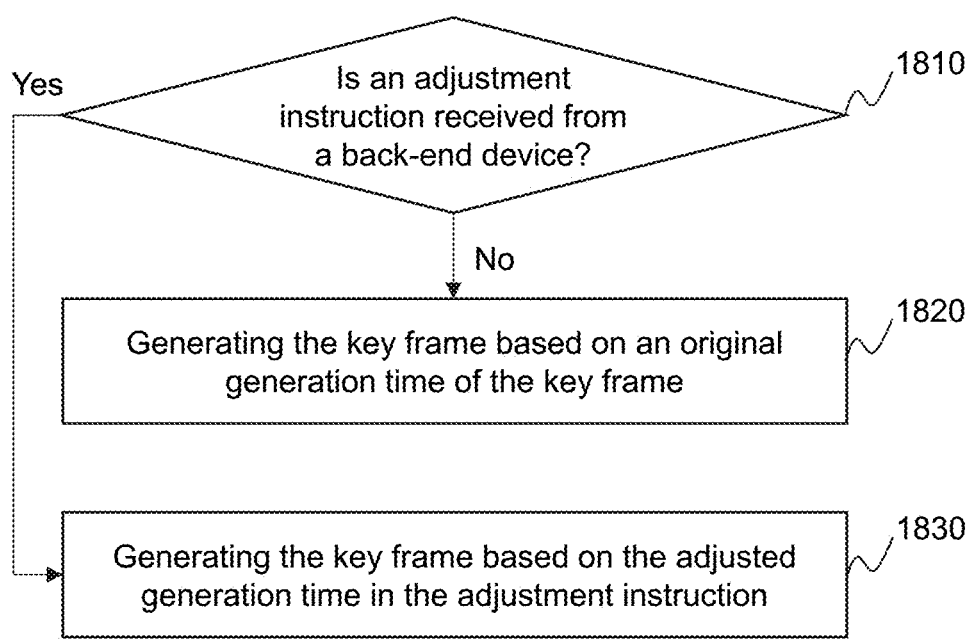
FIG. 18 is a flowchart illustrating an exemplary process for data transmission according to some embodiments of the present disclosure.

FIG. 18 is a flowchart illustrating an exemplary process for data transmission according to some embodiments of the present disclosure. In some embodiments, the process 1800 may be implemented as a set of instructions (e.g., an application) stored in the storage ROM 230 or RAM 240. The acquisition device 130 may execute the set of instructions, and when executing the instructions, the acquisition device 130 may be configured to perform the process 1800. The operations of the illustrated process presented below are intended to be illustrative. In some embodiments, the process 1800 may be accomplished with one or more additional operations not described and/or without one or more of the operations herein discussed. Additionally, the order in which the operations of the process as illustrated in FIG. 18 and described below is not intended to be limiting.

In 1810, the acquisition device 130 may determine whether an adjustment instruction is received from a back-end device. The adjustment instruction may include an adjusted generation time of a key frame of the video data.

In 1820, in response to determining that an adjustment instruction is received from the back-end device, the acquisition device 130 may generate the key frame based on the adjusted generation time in the adjustment instruction.

In 1830, in response to determining that no adjustment instruction is received from the back-end device, the acquisition device 130 may generate the key frame based on an original generation time of the key frame.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 19:
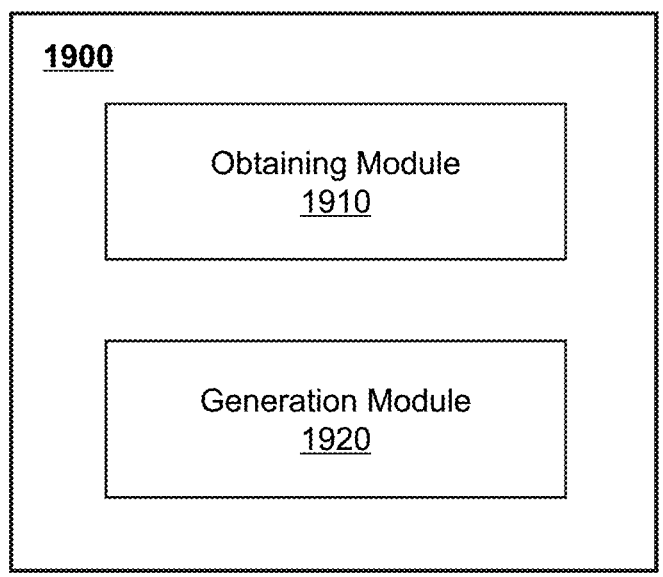
FIG. 19 is a schematic diagram illustrating an exemplary terminal device according to some embodiments of the present disclosure.

FIG. 19 is a schematic diagram illustrating an exemplary terminal device according to some embodiments of the present disclosure. In some embodiments, the terminal device 130 may be implemented on the terminal device 1900 shown in FIG. 19. The terminal device 1900 may include an obtaining module 1910 and a generation module 1920.

The obtaining module 1910 may be configured to determine whether an adjustment instruction is received from a back-end device. The adjustment instruction may include an adjusted generation time of a key frame of the video data.

The generation module 1920 may be configured to generate the key frame based on the adjusted generation time in the adjustment instruction in response to determining that an adjustment instruction is received from the back-end device.

The generation module 1920 may be configured to generate the key frame based on an original generation time of the key frame in response to determining that no adjustment instruction is received from the back-end device.

The modules and units in the terminal device 1900 may be connected to or communicated with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the terminal device 1900 may further include a storage module (not shown in FIG. 19). The storage module may be configured to store data generated during any process performed by any component of in the terminal device 1900. As another example, each of components of the terminal device 1900 may correspond to a storage module, respectively. Additionally or alternatively, the components of the terminal device 1900 may share a common storage module. As still another example, the decoding module may be omitted.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or comlocation of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer-readable program code embodied thereon.

A computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in a combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations thereof, are not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A system, comprising:
   at least one storage device including a set of instructions; and
   at least one processor in communication with the at least one storage device, wherein when executing the set of instructions, the at least one processor is directed to perform operations including:
   obtaining parameter information of a plurality of acquisition devices that communicate with the system to transmit video data to the system, the parameter information of each of the plurality of acquisition device including transmission information of a target key frame of the video data of the acquisition device and a size of a group of picture (GOP);
   determining, based on the parameter information, whether there are collision key frames in the target key frames of the plurality of acquisition devices, including:
   determining a hash period based on the size of GOP;
   mapping the target key frames of the plurality of acquisition devices into the hash period based on the transmission information of the target key frames of the plurality of acquisition devices; and
   determining, based on the mapping of the target key frames in the hash period, whether there are collision key frames in the target key frames of the plurality of acquisition devices; and
   in response to determining that there are collision key frames, adjusting an original generation time of at least one of the collision key frames, so that after the adjustment, there is no collision key frame in the target key frames of the plurality of acquisition devices, including:
   determining one or more idle periods in the hash period based on the mapping of the target key frames in the hash period, a first count of target key frames in each of the one or more idle periods being less than a first count threshold; and
   adjusting the original generation time of the at least one collision key frame, so that the at least one adjusted collision key frame is in the one or more idle periods.

2. The system of claim 1, wherein communication ways between the plurality of acquisition devices and the system are the same.

3. The system of claim 1, wherein adjusting the original generation time of the at least one collision key frame, so that the at least one adjusted collision key frame is in the one or more idle periods includes:
   keeping the original generation time of one of the collision key frames unchanged; and
   adjusting the original generation time of the remaining of the collision key frames, so that the at least one adjusted collision key frame is in the one or more idle periods.

4. The system of claim 3, wherein
   the parameter information further includes an inter frame space (IFS);
   the transmission information includes timestamps of the target key frames of the plurality of acquisition devices at which the system will receives the target key frames; and
   determining, based on the parameter information, whether there are collision key frames in the target key frames of the plurality of acquisition devices includes:
   dividing the hash period into a plurality of slots based on the size of GOP and the IFS, each of the plurality of slots including at least one IFS;
   mapping the target key frames of the plurality of acquisition devices into the plurality of slots of the hash period based on the timestamps of the target key frames; and
   determining whether a second count of target key frames in one of the plurality of slots is larger than a second count threshold; and
   in response to determining that the second count of target key frames in one of the plurality of slots is larger than the second count threshold, determining the target key frames in the one of the plurality of slots as the collision key frames.

5. The system of claim 4, wherein dividing the hash period into the plurality of slots based on the size of GOP and the IFS includes:
   determining a hash time interval based on the IFS;
   dividing the hash period by the hash time interval;
   determining, as a hash array count, a first integer value that is equal to an integer part of the division; and
   dividing the hash period into the plurality of slots based on the hash time interval and the hash array count.

6. The system of claim 5, wherein
   the parameter information further includes a count of the plurality of acquisition devices; and
   the hash time interval is determined based on the IFS, the size of GOP, and the count of the plurality of acquisition devices.

7. The system of claim 5, wherein mapping the target key frames of the plurality of acquisition devices into the plurality of slots of the hash period based on the timestamps of the target key frames includes:
   for each of the target key frames, determining, in the plurality of slots of the hash period, an original slot of the target key frame based on the timestamp of the target key frame.

8. The system of claim 7, wherein determining, in the plurality of slots of the hash period, the original slot of the target key frame based on the timestamp of the target key frame includes:
   determining a first remainder by dividing the timestamp of the target key frame by the hash period;

determining a second integer value that is equal to an integer part of a division between the first remainder and the hash time interval; and designating one of the plurality of slots of the hash period corresponding to the second integer value as the original slot of the target key frame.

9. The system of claim 8, wherein determining, in the plurality of slots of the hash period, the original slot of the target key frame based on the timestamp of the target key frame further includes:

determining a second remainder by dividing the second integer value by the hash array count;

determining whether the second integer value is equal to the second remainder;

in response to determining that the second integer value is equal to the second remainder, determining the second integer value as being effective; or in response to determining that the second integer value is not equal to the second remainder, determining the second integer value as being non-effective.

10. The system of claim 7, wherein mapping the target key frames of the plurality of acquisition devices into the plurality of slots of the hash period based on the timestamps of the target key frames further includes:

determining, in the plurality of slots of the hash period, a modified slot of the target key frame based on the original slot and a first slot of a previous key frame immediately prior to the target key frame.

11. The system of claim 10, wherein determining, in the plurality of slots of the hash period, the modified slot of the target key frame based on the original slot and the first slot of the previous key frame immediately prior to the target key frame includes:

designating a serial number for the target key frame;

comparing the serial number with a number threshold; and determining, in the plurality of slots of the hash period, the modified slot of the target key frame based on the comparison, the original slot, and the first slot of the previous key frame of the target key frame.

12. The system of claim 4, wherein each of the one or more idle periods corresponds to one of the plurality of slots that is different from the slot corresponding to the collision key frames.

13. The system of claim 12, wherein adjusting the original generation time of the remaining of the collision key frames, so that the at least one adjusted collision key frame is in the one or more idle periods includes:

for each of the plurality of slots, determining an idle weight of the slot based on whether the slot and one or more adjacent slots of the slot are the idle periods; and adjusting the original generation time of the remaining of the collision key frames, so that the at least one adjusted collision key frame is in at least one of the one or more idle periods of which the idle weight is larger than a weight threshold.

14. The system of claim 3, wherein the transmission information of the target key frames includes transmission periods of the target key frames in which the target key frames will be transmitted from the plurality of acquisition devices to the system; and determining, based on the parameter information, whether there are collision key frames in the target key frames of the plurality of acquisition devices includes:

mapping the target key frames of the plurality of acquisition devices into the hash period by mapping the transmission periods of the target key frames into the hash period; and determining, based on the mapping of the transmission periods, the target key frames that overlap with each other as the collision key frames.

15. The system of claim 14, wherein adjusting the original generation time of the remaining of the collision key frames, so that the at least one adjusted collision key frame is in the one or more idle periods includes:

adjusting the original generation time of one of the remaining of the collision key frames, so that the transmission period of the adjusted collision key frame is in the middle of one of the one or more idle periods.

16. The system of claim 15, wherein the at least one processor is directed to perform the operations further including:

determining an adjustment instruction based on the adjusted generation time of the at least one adjusted collision key frame; and sending the adjustment instruction to at least one of the plurality of acquisition device corresponding to the at least one adjusted collision key frame.

17. A method implemented on a machine including at least one processor and at least one storage device, comprising:

obtaining parameter information of a plurality of acquisition devices that communicate with a back-end device to transmit video data to the back-end device, the parameter information of each of the plurality of acquisition device including transmission information of a target key frame of the video data of the acquisition device and a size of a group of picture (GOP);

determining, based on the parameter information, whether there are collision key frames in the target key frames of the plurality of acquisition devices, including:

determining a hash period based on the size of GOP;

mapping the target key frames of the plurality of acquisition devices into the hash period based on the transmission information of the target key frames of the plurality of acquisition devices; and determining, based on the mapping of the target key frames in the hash period, whether there are collision key frames in the target key frames of the plurality of acquisition devices; and in response to determining that there are collision key frames, adjusting an original generation time of at least one of the collision key frames, so that after the adjustment, there is no collision key frame in the target key frames of the plurality of acquisition devices, including:

determining one or more idle periods in the hash period based on the mapping of the target key frames in the hash period, a first count of target key frames in each of the one or more idle periods being less than a first count threshold; and adjusting the original generation time of the at least one collision key frame, so that the at least one adjusted collision key frame is in the one or more idle periods.

18. The method of claim 17, wherein the parameter information further includes an inter frame space (IFS);

the transmission information includes timestamps of the target key frames of the plurality of acquisition devices at which the system will receives the target key frames; and determining, based on the parameter information, whether there are collision key frames in the target key frames of the plurality of acquisition devices includes:

dividing the hash period into a plurality of slots based on the size of GOP and the IFS, each of the plurality of slots including at least one IFS;

mapping the target key frames of the plurality of acquisition devices into the plurality of slots of the hash period based on the timestamps of the target key frames; and determining whether a second count of target key frames in one of the plurality of slots is larger than a second count threshold; and in response to determining that the second count of target key frames in one of the plurality of slots is larger than the second count threshold, determining the target key frames in the one of the plurality of slots as the collision key frames.

19. The method of 18, wherein the transmission information of the target key frames includes transmission periods of the target key frames in which the target key frames will be transmitted from the plurality of acquisition devices to the system; and determining, based on the parameter information, whether there are collision key frames in the target key frames of the plurality of acquisition devices includes:

mapping the target key frames of the plurality of acquisition devices into the hash period by mapping the transmission periods of the target key frames into the hash period; and determining, based on the mapping of the transmission periods, the target key frames that overlap with each other as the collision key frames.

20. A non-transitory computer readable medium, comprising at least one set of instructions, wherein when executed by one or more processors of a computing device, the at least one set of instructions causes the computing device to perform a method, the method comprising:

obtaining parameter information of a plurality of acquisition devices that communicate with a back-end device to transmit video data to the back-end device, the parameter information of each of the plurality of acquisition device including transmission information of a target key frame of the video data of the acquisition device and a size of a group of picture (GOP);

determining, based on the parameter information, whether there are collision key frames in the target key frames of the plurality of acquisition devices, including:

determining a hash period based on the size of GOP;

mapping the target key frames of the plurality of acquisition devices into the hash period based on the transmission information of the target key frames of the plurality of acquisition devices; and determining, based on the mapping of the target key frames in the hash period, whether there are collision key frames in the target key frames of the plurality of acquisition devices; and in response to determining that there are collision key frames, adjusting an original generation time of at least one of the collision key frames, so that after the adjustment, there is no collision key frame in the target key frames of the plurality of acquisition devices, including:

determining one or more idle periods in the hash period based on the mapping of the target key frames in the hash period, a first count of target key frames in each of the one or more idle periods being less than a first count threshold; and adjusting the original generation time of the at least one collision key frame, so that the at least one adjusted collision key frame is in the one or more idle periods.

\* \* \* \* \*